United States Patent
Van Ho et al.

(10) Patent No.: US 11,899,626 B2
(45) Date of Patent: Feb. 13, 2024

(54) LAYER MAPPING

(71) Applicant: Nuvolo Technologies Corporation, Paramus, NJ (US)

(72) Inventors: Khoa Nguyen Van Ho, Houston, TX (US); Tejas Yadav, West Haven, CT (US)

(73) Assignee: Nuvolo Technologies Corporation, Paramus, NJ (US)

( * ) Notice: Subject to any disclaimer, the term of this patent is extended or adjusted under 35 U.S.C. 154(b) by 0 days.

(21) Appl. No.: 17/345,794

(22) Filed: Jun. 11, 2021

(65) Prior Publication Data
US 2022/0215604 A1  Jul. 7, 2022

Related U.S. Application Data

(60) Provisional application No. 63/134,892, filed on Jan. 7, 2021, provisional application No. 63/134,949, filed on Jan. 7, 2021.

(51) Int. Cl.
| | |
|---|---|
| *G06F 16/178* | (2019.01) |
| *G06T 11/60* | (2006.01) |
| *G06F 16/23* | (2019.01) |
| *G06F 16/11* | (2019.01) |

(52) U.S. Cl.
CPC .......... *G06F 16/178* (2019.01); *G06F 16/116* (2019.01); *G06F 16/2365* (2019.01); *G06T 11/60* (2013.01); *G06T 2210/04* (2013.01)

(58) Field of Classification Search
CPC ............................ G06T 11/60; G06T 2210/00
See application file for complete search history.

(56) References Cited

U.S. PATENT DOCUMENTS

| | | |
|---|---|---|
| 6,341,291 B1 | 1/2002 | Bentley et al. |
| 8,155,943 B2 | 4/2012 | Nasle |
| 8,447,782 B1 * | 5/2013 | Vipul .................... G06F 16/252 |
| | | 707/790 |
| 8,818,769 B2 | 8/2014 | Trainer et al. |

(Continued)

OTHER PUBLICATIONS

Github.com, (Aug. 17, 2020) "Deepzoom (PHP Library)", Daniel-KM Library Deepzoom, retrieved on Aug. 17, 2020, retrieved from URL: https://github.com/Daniel-KW /LibraryDeepzoom, 4 pages.

(Continued)

*Primary Examiner* — Sing-Wai Wu
*Assistant Examiner* — Khoa Vu
(74) *Attorney, Agent, or Firm* — Mintz, Levin, Cohn, Ferris, Glovsky and Popeo, P.C.

(57) ABSTRACT

Methods, systems, and apparatus, including computer programs encoded on a computer storage medium, for performing a layer mapping operation are described. A described technique includes receiving a drawing file comprising a first set of layers. A template that defines one or more protocols that control the layer data value aggregation is selected. A set of data values associated with one or more layers in the first set of layers is aggregated in response to applying at least one of the one or more protocols to the drawing file. A second set of layers is generated using the set of data values. A layer mapping output that specifies a second set of layers is generated. The layer mapping output is provided as an input to an application module of a space management program.

20 Claims, 6 Drawing Sheets

(56) References Cited

U.S. PATENT DOCUMENTS

| | | |
|---|---|---|
| 9,454,623 B1 | 9/2016 | Kaptsan |
| 10,121,286 B2 | 11/2018 | Alsaffar et al. |
| 10,445,438 B1 | 10/2019 | Motonaga et al. |
| 10,937,033 B1 | 3/2021 | Rodriguez et al. |
| 2007/0186160 A1 | 8/2007 | McArdle et al. |
| 2007/0226314 A1 | 9/2007 | Eick et al. |
| 2008/0016472 A1* | 1/2008 | Rohlf .............. G06F 16/9537 715/848 |
| 2008/0172605 A1 | 7/2008 | Smith |
| 2010/0169272 A1 | 7/2010 | Labatte et al. |
| 2014/0063058 A1* | 3/2014 | Fialho ................ G06T 19/006 345/633 |
| 2015/0106325 A1 | 4/2015 | Cole et al. |
| 2015/0293941 A1 | 10/2015 | Eichhorn |
| 2015/0379957 A1 | 12/2015 | Roegelein et al. |
| 2016/0246899 A1 | 8/2016 | Hirschtick et al. |
| 2016/0328421 A1* | 11/2016 | Sarratori ............ G06F 16/285 |
| 2017/0147717 A1* | 5/2017 | Chen .................... G06F 30/13 |
| 2018/0052832 A1 | 2/2018 | Anglin et al. |
| 2018/0113878 A1 | 4/2018 | Duggal et al. |
| 2019/0213287 A1* | 7/2019 | Ye ....................... G06F 30/13 |
| 2019/0228020 A1 | 7/2019 | Sawatzky et al. |
| 2020/0285514 A1 | 9/2020 | Ghare et al. |
| 2020/0351337 A1 | 11/2020 | Calmon et al. |
| 2020/0401593 A1 | 12/2020 | Panuganty et al. |
| 2021/0049280 A1* | 2/2021 | Koshy ................. H04W 12/08 |
| 2021/0073449 A1 | 3/2021 | Segev et al. |
| 2021/0383037 A1* | 12/2021 | Segev ................. G06F 30/18 |
| 2022/0067454 A1 | 3/2022 | Gupta et al. |
| 2022/0092225 A1 | 3/2022 | Parker et al. |
| 2022/0092834 A1 | 3/2022 | Ye et al. |
| 2022/0171892 A1 | 6/2022 | Ho et al. |
| 2022/0171893 A1 | 6/2022 | Ye et al. |
| 2022/0188472 A1 | 6/2022 | Parker |
| 2022/0206445 A1* | 6/2022 | Reichl .................. H04L 12/66 |
| 2022/0206856 A1 | 6/2022 | Parker |
| 2022/0214999 A1 | 7/2022 | Yadav et al. |

OTHER PUBLICATIONS

Github.com, (Aug. 17, 2020) "TiledSharp", Marshallward/TiledSharp, retrieved on Aug. 17, 2020, retrieved from URL: https://github.com/marshallward/TiledSham, 4 pages.

Stackexchange.com, (Jun. 2, 2020) "If Geographic Coordinates are Unprojected Coordinates, How Can GIS Soft Wares Display Such Unprojected Data in a Plane?", GGeographic Information Systems Geographic Information Systems, retrieved on 61212020, retrieved from URL:https://gis.stackexchange.com/questions/146321/ifgeographiccoordinates-are-unprojected-coordinates-how-can-gis-softwares-dis#:-:text, 2 pages.

Wikipedia, (2020) "Map Projection", https://en.wikipedia.org/w/index.php?title=Map projection&oldid=955953903, 16 pages.

Wikipedia (2020) "Spatial Reference System", https://en.wikipedia.org/w/index.phptitle=Spatial_reference_system&oldid=956142752, 4 pages.

Wikipedia (2020) "Tiled Web Map", https://en.wikipedia.org/w/index.php?title=Tiled web map&oldid=956139437, 3 pages.

Ekanayake et al. (2008) "MapReduce for Data Intensive Scientific Analysis", Fourth IEEE International Conference on eScience, 277-284 Pages.

Condie et al. (2010) "Online Aggregation and Continuous Query Support in Mapreduce", SIGMOD'10, 1115-1118.

Chen et al. (2019) "Floor-SP: Inverse CAD for Floorplans by Sequential Room-Wise Shortest Path", IEEE International Conference on Computer Vision (ICCV), 10 pages.

Muller et al. (2006) "Procedural Modeling of Buildings", Association for Computing Machinery, Inc., 25(3):614-623.

Zhu et al. (Dec. 19, 2013) "A New Reconstruction Method for 3D Buildings From 2D Vector Floor Plan", HAL Open Science, pp. 1-14(15 pages).

\* cited by examiner

LAYER MAPPING

CROSS-REFERENCE TO RELATED APPLICATIONS

This document claims the benefit of U.S. Provisional Application No. 63/134,949, entitled "LAYER MAPPING," filed on Jan. 7, 2021. The entire disclosure of U.S. Provisional Application No. 63/134,949 is expressly incorporated by reference herein in its entirety.

This document is related to U.S. Provisional Application No. 63/134,892, entitled "SYNCHRONIZATION OF GRAPHICAL DATA," filed on Jan. 7, 2021. The entire disclosure of U.S. Provisional Application No. 63/134,892 is expressly incorporated by reference herein in its entirety.

TECHNICAL FIELD

This description relates to computing processes for converting electronic files.

BACKGROUND

Computer design models such as computer-aided design ("CAD") models are commonly used to represent real-world constructs. Sometimes it is helpful to limit access to certain versions of a computer design model that may contain information that presents a security risk. However, maintaining multiple different versions of the computer design model can often lead to certain versions becoming outdated and to data conflicts between the different versions that may be difficult to resolve. Existing solutions may be inadequate due to the inherent flaws that arise with maintaining multiple different versions of the computer design model.

SUMMARY

Systems and techniques for performing layer mapping of layers in a drawing file are described. The drawing file is generated using an example CAD application. For example, the drawing file may be generated using AutoCAD and may be based on one or more CAD models or documents relating to a CAD model. An example system includes a layer mapping module that can be configured to execute computational processes of the disclosed techniques. For example, the layer mapping module receives a drawing file that includes a set of drawing layers. The layer mapping module analyzes the set of drawing layers, extracts data values from the set of drawing layers, and aggregates a subset of the extracted data values that are determined to be eligible for a layer mapping output file.

In some implementations, the layer mapping module is configured to generate a set of new drawing layers in response to aggregating the subset of the extracted data values. The new drawing layers can include a portion of the data originally included in the drawing layers of the drawing file. Additionally or alternatively, the new drawing layers may be organized differently than the drawing layers. For example, to generate the set of new drawing layers, the layer mapping module can process data values for each layer in the set to determine a grouping of layers in accordance with protocols of a mapping template. The protocols can specify attributes or space elements in a layer that are used to determine the grouping of layers and drive the manner in which layers in the set are reorganized to generate the new drawing layers. The layer mapping module generates a layer mapping output file that includes the new drawing layers. In some cases, the new drawing layers may include space elements from multiple layers of the original drawing layers.

In some implementations, the layer mapping module generates the new drawing layers using a template. The layer mapping module may select the template from a plurality of available templates. Each template in the plurality of templates may include one or more protocols that define operations for extracting data values from drawing layers and aggregating at least a subset of the extracted data values to generate the new drawing layers. As an example, a the protocols of a selected template corresponding to users with a security level of two may provide for the removal of any space elements or other information in the drawing layers that is tagged with a security level of three or greater. This may result in, for example, the layer mapper module filtering all space elements that represent the security devices in building represented by the CAD model document when generating the new drawing layers.

In some implementations, the layer mapping module generates the layer mapping output file using user input. For example, the layer mapping module may receive instructions from an administrator indicating that all furniture space elements and security device space elements in the CAD model should not be included in the layer mapping output file. The layer mapping module may treat these instructions as protocols for generating the layer mapping output file. For example, in response to receiving these instructions, the layer mapping module may filter all data values in the drawing layers of the CAD model that correspond to security device space elements or furniture space elements.

In some implementations, the layer mapping module generates the layer mapping output file using a combination of a template and user input. For example, the user input may be used to identify a template that should be used to analyze the CAD model and generate the new drawing layers. As another example, the layer mapping module may use the user input to temporarily or permanently modify the protocols of a template. For example, the user input may indicate additional protocols that must be met, or modifications to protocols in the template in order to customize the template for the particular user, a particular computing system, or a particular group of users.

In some implementations, the layer mapping module automatically imports the CAD model and its drawing layers from a file storage and automatically executes its layer mapping and data processing operations. The layer mapping module may perform these operations in response to detecting a triggering event, such as current time matching a particular time of a schedule event, an indication that a CAD model has been recently modified, or a milestone associated with the CAD model having been marked as complete.

In some implementations, the layer mapping module receives the CAD model from a remote computing device. The layer mapping module may execute its layer mapping and data processing operations in response to receiving the CAD model.

In one aspect, a method includes: receiving, by a layer mapping module, a drawing file includes a first set of layers; selecting, by the layer mapping module, a template that defines one or more protocols that control layer data value aggregation; aggregating, using the layer mapping module, a set of data values associated with one or more of the layers in the first set of layers in response to applying at least one of the one or more protocols to the drawing file; generating, using the layer mapping module, a second set of layers using the set of data values, where each layer in the second set of layers includes at least one data value of the set of data values; generating, using layer mapping module, a layer mapping output that specifies a second set of layers used to graphically render one or more space elements represented in the second set of layers; and providing the layer mapping output as an input to an application module of a space management program.

Implementations can include one or more of the following features. For example, in some implementations, the method includes extracting the set of data values of the one or more layers in the first set of layers in response to applying at least one of the protocols to the drawing file.

In some implementations, each layer in the second set of layers is associated with a set of inclusion criteria defined by the template, and aggregating the set of data values includes applying the at least one of the protocols to the set of data values to determine a subset of data values of the set of data values that meet inclusion criteria in the set of inclusion criteria for at least one of the layers in the second set of layers.

In some implementations, generating the second set of layers includes assigning each data value in the subset of data values to a layer in the second set of layers.

In some implementations, generating the second set of layers includes: determining for data values in the subset of data values the one or more space elements as a set of space elements for inclusion in the second set of layers; obtaining additional data values associated with the space elements in the set of space elements; and aggregating the subset of data values and the additional data values in accordance with the one or more protocols of the template to generate the second set of layers.

In some implementations, aggregating the set of data values includes aggregating data values corresponding to one or more particular space elements together in a layer of the second set of layers in accordance with the template.

In some implementations, aggregating the set of data values includes aggregating data values corresponding to one or more types of space elements together in a layer of the second set of layers in accordance with the template.

In some implementations, aggregating the set of data values includes aggregating data values corresponding to space elements located in a particular location or in a defined area.

In some implementations, aggregating the set of data values includes aggregating data values corresponding to space elements associated with a particular user or group of users.

In some implementations, the method includes receiving instructions from a remote computing device, where selecting the template that defines the one or more protocols includes selecting the template from a plurality of templates based on the instructions.

In some implementations, selecting the template that defines the one or more protocols includes: identifying one or more attributes of the design model; and based on the one or more attributes, selecting the template from a plurality of templates.

In some implementations, selecting the template that defines the one or more protocols includes determining a security level of an end-user that is to have access to a visual rendering generated using the layer mapping output; and based on the security level of the end-user, selecting the template from a plurality of templates.

In some implementations, a first number of layers in the first set of layers is greater than a second number of layers in the second set of layers.

In some implementations, a data size corresponding to the first set of layers is greater than a data size corresponding to the second set of layers.

In some implementations, a single layer in the second set of layers includes data values corresponding to multiple space elements, and multiple layers in the first set of layers include data values corresponding to the multiple space elements such that no single layer in the first set of layers includes data values corresponding to the multiple space elements.

In some implementations, receiving the drawing file includes receiving a drawing file that includes a set of layers that correspond to at least one of: a floor plan of a property, an interior wall of the property, an exterior wall of the property, a room of the property, an interior area of the property, locations of security devices of the property, capabilities of Wi-Fi hotspots in the property, or types of furniture in the property.

In some implementations, receiving the drawing file includes receiving a computer-aided design document.

In some implementations, receiving the drawing file includes: generating a request for the drawing file in response to detecting an event corresponding to the drawing file; and transmitting the request for the drawing file to an external computing system.

The described techniques can be used to realize various advantages. For example, the techniques disclosed provide for improved management of computer CAD models. Notably, the disclosed system provides for using a single computer CAD model as a basis for generating customized versions of the computer CAD model to fit the needs of the current program or project, the end-user, or an administrator or project manager. These versions of the computer CAD model can be customized in various ways, such as to place the computer CAD model in a form that is consistently used by a particular user, a group of users, or a system. That is, the described techniques can be used to effectively modify the base CAD model when needed to meet the needs of the program, such as to account for the security level of an end-user by filtering information that they are not permitted to access, or to remove information that is unnecessary for the current needs of the project or the end-user. By using the same base CAD model to generate each of these customized versions of the CAD model, end-users are assured to receive the most up-to-date version of the CAD model. This also has the added benefits of improving the security by limiting access to sensitive information, improving safety and reducing waste by ensuring that end-users are receiving the most up-to-date version of the design model, and improving efficiency by not having to maintain multiple different design models, reducing the likelihood or the extent of data conflicts, and reducing the amount of information that is required to be processed.

Other implementations of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

The details of one or more implementations are set forth in the accompanying drawings and the description below.

Other features and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
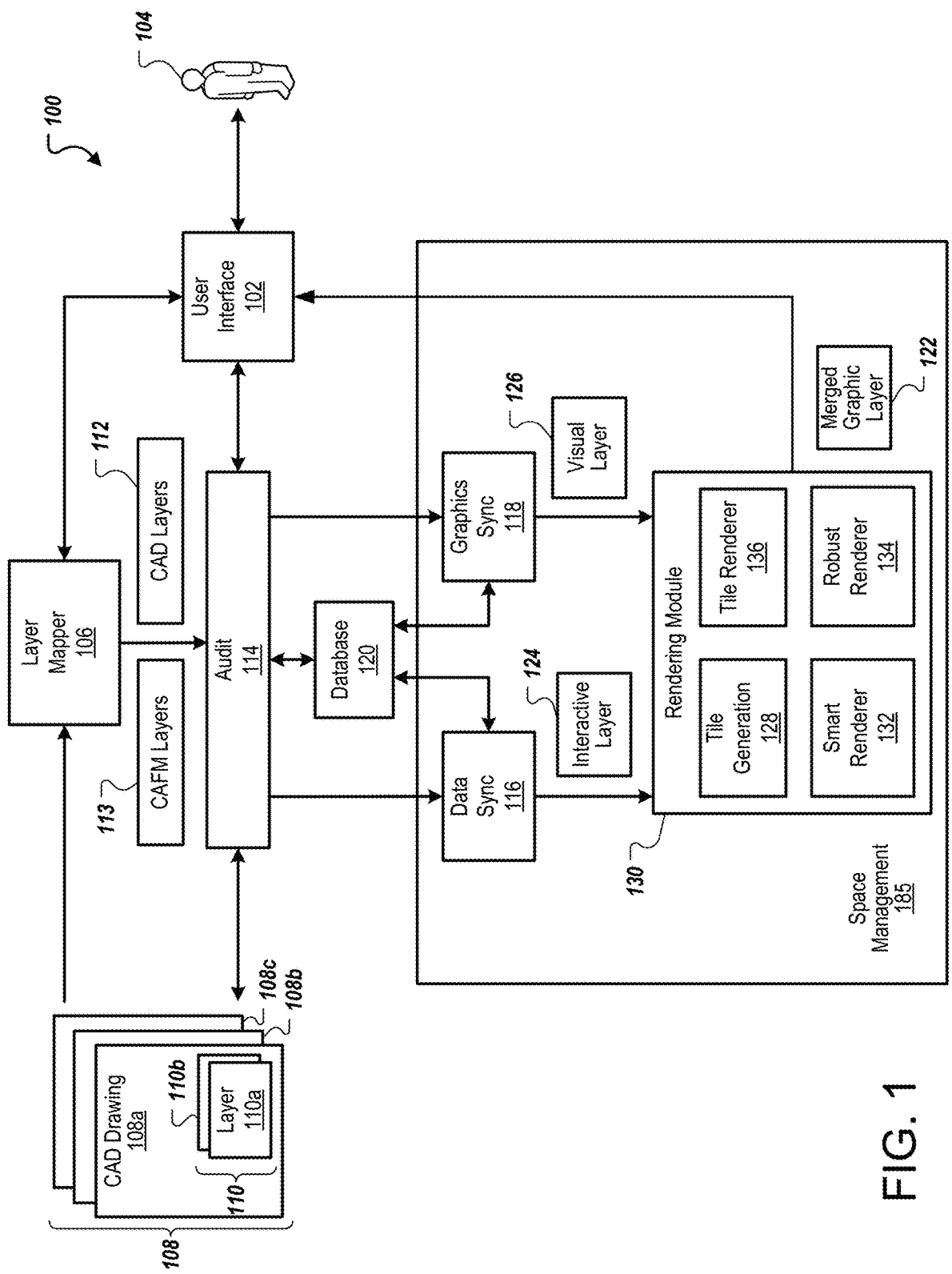
FIG. 1 illustrates an example computing system for obtaining information from one or more drawing files.

A layer mapping module can generate a layer mapping output file containing a set of drawing layers. In generating the layer mapping output file, the layer mapping module may first receive or obtain a CAD model document that contains an initial set of drawing layers. The layer mapping module can analyze the set of drawing layers in the CAD model document, extract data values from the set of drawing layers, and aggregate a subset of the extracted data values that are determined to be eligible for a layer mapping output file. In aggregating the subset of the extracted data values, the layer mapping module may generate a set of new drawing layers. The new drawing layers may contain a portion of the data originally contained drawing layers of the CAD model document. Additionally or alternatively, the new drawing layers may be organized differently than the drawing layers. For example, the space elements in a layer of the new drawing layers may include space elements from multiple layers of the original drawing layers.

FIG. 1 illustrates an example computing system 100 ("system 100") configured to process one or more drawing files that each include multiple layers. Each layer of a respective drawing file can correspond to an item of a geographic entity, such as a building or physical location. For example, each of the multiple layers can correspond to a respective item such as a floorplan of a floor in the building, a room of a floor in the building that is represented by the floorplan, or an interior or exterior wall of a room included in the floorplan. Additional details about individual layers and corresponding items that may be associated with a given layer are described in more detail below.

In some implementations, the system 100 is configured to implement a framework for interpreting and extracting graphics and data elements of an example drawing file to digitally render the items of a building for presentation to the user 104. The graphics and data elements cooperate to present a digital representation of the items in an application program used to generate the drawing file. For example, the drawing file can be a DXF file generated by an example CAD program and encode data representations of real-world items, such as the example items described above. Example drafting/design programs may include various commercial CAD tools or related drafting software applications.

Data representations of real-world items in separate or distinct drawing files, or even across distinct layers of a drawing file, can be encoded and arranged differently based on design preferences and drafting protocols used in the CAD program. Because these data representations are often encoded in a variety of ways, extracting specific types of information from a drawing file can be challenging. To address these challenges, the system 100 includes a set of modules that are each configured to execute a subset of the techniques for implementation of the framework used to extract graphics and data elements of a drawing file or present at least some of the extracted graphics, data elements, or both.

The system 100 can include one or more processing components, such as one or more processors. The system 100 can also include a computer-readable storage medium coupled to the one or more processors. The storage medium can include a program for execution by the one or more processors. In more detail, the program can include instructions that, when executed by the one or more processors, cause the one or more processors to perform various operations described herein.

The system 100 generally includes a user interface 102 that receives input from a user 104. The user interface 102 can be a graphical interface rendered for display at an example computing device of the system 100. Although not depicted in the example of FIG. 1, the computing device can be any known device operable to display a graphical interface, such as a desktop computer with a display monitor, a laptop computer, a tablet device, a smartphone, a networked client/mobile device, or other related devices. The computing device is operable to exchange data communications with other devices (e.g., client and server devices) of the system 100.

The system 100 includes a layer mapper 106 configured to receive drawing files 108a, 108b, 108c (drawing files 108). Each drawing file 108a, 108b, 108c includes one or more layers indicated generally as layers 110 that include layers 110a and 110b. In some implementations, the layer mapper 106 obtains the drawings files 108 based on input from user 104 that is received by way of user interface 102. The layer mapper 106 can receive or obtain the drawing files 108 independent of input from user 104 but execute its file audit and data processing operations based on user input received by way of user interface 102.

In some implementations, the layer mapper 106 automatically imports the drawing files 108 from a file storage location and automatically executes its layer mapping and data processing operations. The file storage location may be internal or external to the system 100. For example, the file storage location may correspond to a database 120 (described in more detail below) that includes database tables for storing information about space hierarchies of a geographic location. The space hierarchies may define a physical layout of a region, campus, site, or floor of the geographic location.

In some implementations, the layer mapper 106 is configured to receive or obtain, as inputs, each of the drawing files 108 and generate a layer mapping file based on processes performed on the received inputs. The processes may be executed by the layer mapper 106 based on a mapping template, user input from user 104, or both. In some implementations, the layer mapper 106 generates a layer mapping file based on instructions or commands specified by a space/system administrator ("space admin") that indicate operations to be performed on the drawing files 108. The instructions can define or indicate layers of the drawing files 108 as well as computer-aided facility management ("CAFM") layers stored among database tables of the system 100.

The layer mapper 106 can select a mapping template that defines protocols for aggregating sets of data values of the different layers with respect to instructions and database values of the CAFM layers 113 as indicated by a space admin. For example, the layer mapper 106 can receive layer data for multiple layers of a drawing file 108b, where the layer data specifies information for items such as hallways, offices on a floor, types of furniture in the offices, locations of security cameras on the floor, or capabilities of various Wi-Fi hotspots on the floor. The layer mapper 106 can use the template protocols to aggregate values for types of office furniture for a particular office while, for example, filtering out data values that indicate locations of security cameras on a floor.

In more detail, for one or more drawing files 108, the layer mapper 106 can map portions of the layer data for different layers, such as furniture in the offices, to a hierarchy of the CAFM layers 113 (e.g., indicating each office on a floor) as defined in the database to produce a grouping of CAD layers 112. For example, the grouping of CAD layers 112 can represent a group of offices on the 9th floor of a building along with each item of furniture in each office of the group. In some implementations, the layer mapper 106 determines the mapping between the drawing layers 110 and the CAFM layers 113 at least by processing data values of the different drawing layers (e.g., received inputs) against the protocols defined by the mapping template and with reference to any grouping preferences indicated by the user 104 or the space admin.

The layer mapper 106 generates a layer mapping output represented by CAD layers 112 based on the mapping between layers of the drawing files 108 (e.g., the layers 110) and the CAFM layers 113 in a database table of the system 100. In some implementations, the layer mapper 106 generates a layer mapping output that aggregates information such as data values and entity records of the received inputs based on the determined mapping of the layers. The layer mapper 106 can generate a layer mapping output that groups layer types such as the offices, the Wi-Fi hotspots, and the types of office furniture for visual rendering to an end-user, e.g., user 104 or a different user.

An audit module 114 receives or obtains, as inputs, each of the CAD layers 112 or an output of the layer mapper 106, and generates an audit output file based on processes performed on the received inputs. For example, the audit module 114 can be configured to process data corresponding to each of the CAD layers 112 to identify one or more deficiencies and generate an audit output file based on the identified deficiencies. The audit module 114 can scan each of the CAD layers 112 to detect or identify individual deficiencies that will disrupt or adversely impact a file (or layer) importation process executed by the system 100. For example, the audit module 114 can read entity records that store data values for a layer to detect deficiencies such as unclosed polylines, missing space codes, missing space names, or invalid space types. In some implementations, the audit module 114 detects deficiencies of a drawing file in response to processing data types of a layer or entity record of the drawing file against a predefined list of deficiency codes.

The audit module 114 can be configured to generate recommendations for addressing detected deficiencies of a drawing file. For example, the audit module 114 can generate a signal for a detected deficiency in response to determining that a data type for a space name linked to a layer, e.g., among CAD layers 112, is missing a value for the space code. The audit module 114 can determine that the layer corresponds to a room of a floor plan and generate a recommendation for updating the value of the space code to, for example, "room" or "office." In some implementations, the audit module 114 generates an instruction or command to automatically input a value for the missing space code.

In general, the audit module 114 can be configured to standardize layer data of a drawing file for processing by one or more other modules or devices of the system 100. In the example of FIG. 1, the audit module 114 generates an audit output file from one or more groupings of CAD layers 112 based on processes performed on each of the CAD layers 112. The audit module 114 can provide the audit output file to two distinct modules included in the system 100 that perform respective sets of operations for syncing data and graphics for each CAD layer of the CAD layers 112 processed by the audit module 114. For example, the audit module 114 can provide the audit output file to the data sync module 116 and the graphic sync module 118.

The system 100 includes a space management system 185 that runs the space management program. The space management program can extract details about spaces represented by the CAD document such that the spaces can be efficiently managed. For example, conference-room-type spaces can be detected and loaded into a database object that manages the availability of conference rooms, manages who cleans what rooms, or other types of management functions. Having a missing space type, may prevent the space management program from realizing that there is, for example, another conference room to manage. Thus, the audit program can detect the missing space type and have it added. The space management program can use the floor plan information for space reservation, asset tracking, onboarding of new employees such as space allocation for a new employee or transfer of employee, and routine clean up of employee cubicle or desk. Other uses are possible.

The space management system 185 includes a data sync module 116 and a graphics sync module 118. As described above, the system 100 interprets and extracts graphics and data elements of an example drawing file at least to digitally render certain real-world items of a building for visualization to an end-user. The data sync module 116 can be configured to extract the data elements of the example drawing file, whereas the graphics sync module 118 can be configured to extract the graphic elements of the drawing file. Each of the data sync module 116 and the graphics sync module 118 executes its respective extraction and syncing operations based on inputs that correspond to the audit output file generated by the audit module 114 and the data associated with the one or more drawing files 108.

The data sync module 116 can execute a workflow for extracting data values of layers identified in the mapping output and for generating data structures used to stage or preview information linked to groupings of layers in the mapping output. The graphics sync module 118 can execute a workflow for reading and exporting graphical (or spatial) elements of layer data for each of the layers in a grouping specified by the mapping output. In some implementations, to export this graphical data of the layers, the graphics sync module 118 calculates dimensional bounds that are used to generate layers including an interactive layer 124 and a visual layer 126.

In some implementations, the interactive layer 124 is represented with a format for encoding geographic data structures such as GeoJSON, which is standardized by RFC 7946 of the Internet Engineering Task Force (IETF).

In some implementations, the visual layer 126 is represented with graphics format such as scalable vector graphics (SVG). Other format types are possible. In some implementations, the respective outputs of the data sync module 116 and graphics sync module 118 can be stored in a database 120 and later accessed to generate a preview of the data and graphics for a layer or floorplan before final visual rendering.

The respective outputs of the data sync module 116 and graphics sync module 118 may be stored in a database 120 and later accessed to generate a preview of the data and graphics for a layer or floorplan before final visual rendering. Additionally, using outputs of the graphics sync module 118, the system 100 can generate a merged graphics layer 122 by overlaying dimensional coordinates of a GeoJSON file over dimensional coordinates of a scale vector graphics ("SVG") file or one or more images tiles generated from the SVG file. The merged graphics layer can be used for presentation of the preview of the data and graphics for the layer or floorplan, presentation of a final version of the layer or floorplan, or both. In some implementations, the system 100 generates the merged graphics layer 122 based on intelligent analytics and calculations related to spatial coordinates and bounds for respective coordinate systems of the SVG file and GeoJSON file or the one or more image tiles and the GeoJSON file. This is described in more detail below.

The space management system 185 can include a rendering module 130 that leverages tile generation technology to render data and graphics for layers specified by the layer mapping output. In the example of the FIG. 1, the rendering module 130 is coupled for communication with user interface 102 to provide output parameters (e.g., data and graphics elements) for graphically rendering information for a layer as a display output at the user interface 102. As shown, the respective outputs of the data sync module 116 and graphics sync module 118 can be provided to a rendering module 130.

The rendering module 130 includes logic for a smart renderer 132 as well as for a robust renderer 134. The smart renderer 132 can be configured to intelligently switch between non-tile SVG files and image tiles to improve presentation of the merged graphic layers 122 in the user interface 102. In some implementations, the smart renderer 132 enables the rendering module 130 to perform its rendering functions using fewer processor cycles, less memory resources, or both, when dynamic tiling functions of the smart renderer 132 are invoked at the rendering module 130. In some implementations, the smart renderer 132 can enable presentation of the merged graphics layer 122 more quickly using an SVG file than if the merged graphics layer 122 were only presented using image tiles. Hence, the smart renderer 132 can provide improved efficiency relative to other approaches for rendering graphical data at a display.

To improve presentation of the merged graphics layer 122, a tile generation module 128 can generate multiple image tiles from an SVG file. The image tiles can have smaller file sizes, smaller dimensions, or both, than the SVG file. As a result, the system 100 can require fewer resources for presentation the image tiles on the user interface 102 than if the system 100 used the SVG file alone. For instance, when each image tile has a smaller file size, each image tile requires less memory than the memory required to store the SVG file. Further, the system 100 can send an image tile to the computing device more quickly than an SVG file because of the smaller file size.

In some implementations, the computing device that presents the user interface 102 can render the image tile more efficiently than the SVG file because of the smaller file size. When multiple image tiles depict the data for a single SVG file, the computing device can use multi-threading support, whether virtual or actual, to more quickly present the image tiles on the user interface 102 than presentation of the SVG file on the user interface 102. The computing device can use a first thread for presentation of a first image tile and a second thread for presentation of a second image tile.

The tile generation module 128 can decouple image tile generation from the graphic sync process by offloading image tile generation to a separate background process. For example, the graphics sync module 118 can extract graphic elements from a drawing file to generate an SVG file. After generation of the SVG file, the tile generation module 128 can generate the image tiles from the SVG file. Because image tile generation can take longer than the graphic element extraction process, the graphics sync module 118 can generate only an SVG file which generation process is faster than the image tile generation. This can enable the system 100 to present the merged graphics layer 122, e.g., in the user interface 102, using an SVG file, rather than image tiles more quickly than if the system 100 waited until the image tile generation process completed. Once the tile generation module 128 finishes generation of some of the image tiles, the system 100 can then use the image tiles for the merged graphics layer 122, taking advantage of the smaller file sizes of the image tiles.

The robust renderer 134 can be configured to overlay data or dimensional coordinates of the GeoJSON file on top of the data or dimensional coordinates of the SVG file, e.g., for the merged graphics layer 122. This overlay feature of the robust renderer 134 is related to the merged graphics layer 122 and intelligent analytics functions described earlier. In more detail, the robust renderer 134 can be used to execute the intelligent analytics and calculations related to spatial coordinates and bounds for respective coordinate systems of the SVG file and GeoJSON file. The robust renderer 134 allows for cooperation between, and integration of, different coordinate systems to allow for improved visualization of data and graphical elements of drawing layers, e.g., when data for the merged graphics layer 122 is presented on the user interface 102.

When the merged graphics layer 122 includes an interactive GeoJSON layer and multiple image tiles, a tile renderer 136 can coordinate presentation of the GeoJSON layer with the image tiles. For instance, the tile renderer 136 can obtain x-y coordinates in computer-aided design ("CAD") screen space, e.g., for the user interface 102. The tile renderer 136 can use these coordinate to align the GeoJSON layer with the image tiles. For instance, the tile renderer 136 can convert coordinates for the GeoJSON layer into coordinates for the image tiles.

Figure 2:
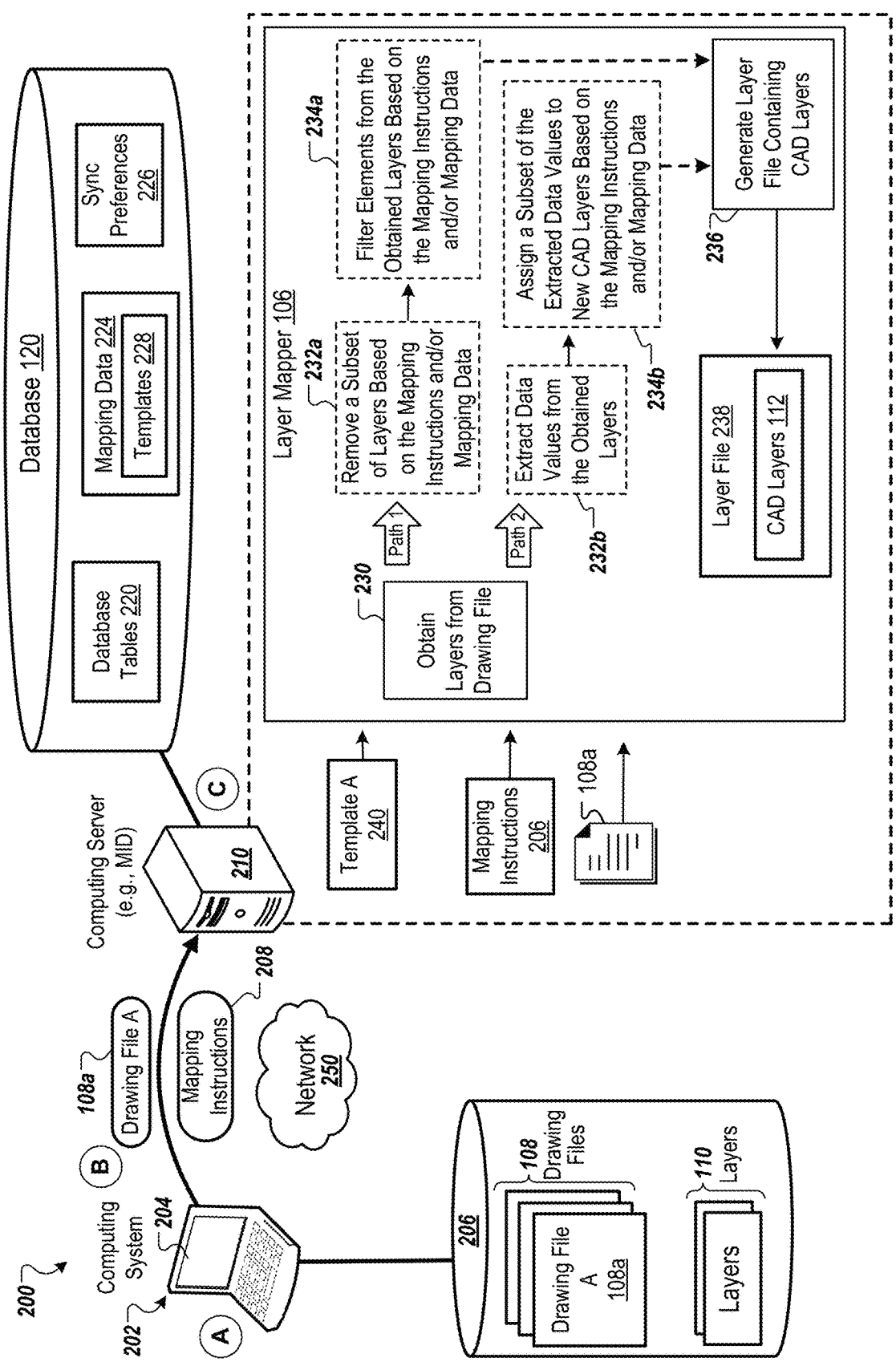
FIG. 2 illustrates an example computing system for performing a layer mapping operation.

FIG. 2 illustrates an example computing system 200 for performing a layer mapping operation. The system 200 may be, or may be part of, the computing system 100 described above with respect to FIG. 1. The system 200 includes a computing system 202 that can access the drawing files 108, and a computing server 210 that can access the database 120. The computing system 202 and the computing server 210 can communicate over a network 250. The computing server 210 can run the layer mapper 106 to execute workflows for extracting the drawing layers 110 from the drawing files 108, to modify the drawing layers 110 and/or select a subset of the drawing layers 110 for inclusion in a layer file 238, and for generating the layer file 238 that contains the CAD layers 112. As an example, the computing server 210 may extract layers from a drawing file 108*a* that the computing server 210 receives from the computing system 202 or otherwise obtains from the computing system 202. In response to receiving or obtaining the drawing file 108*a*, the computing server 210 may initiate one or more workflows corresponding to the layer mapper 106 in order to start the process for generating the layer file 238.

The computing system 202 may be a computing device, such as a desktop computer with a display monitor, a laptop computer, a tablet device, a smartphone, a networked client/mobile device, or other related devices. The computing system 202 may be a client device that can be used to access the computing server 210. For example, the computing system 202 may be a workstation client, a mobile client, a web-based client, etc. The computing system 202 is operable to exchange data communications with other devices (e.g., client and server devices) of the system 200. For example, the computing system 202 is operable to communicate with the computing server 210 over the network 250.

The computing system 202 includes a user interface 204. The user interface 204 may be, for example, a graphical user interface (GUI). As will be described in more detail below, the user interface 204 may be used to present certain data subsets to a user of the computing system 202. The user of the computing system 202 may interact with the computing system 202 through the user interface 204, through one or more sensor input devices (e.g., touchscreen, keyboard, microphone, mouse, etc.), or through a combination of the user interface 204 and one or more sensor input devices. In some implementations, the user interface 204 is the user interface 102 described above with respect to FIG. 1.

The computing system 202 also includes or otherwise has access to data storage 206. The data storage 206 may be locally stored on the computing system 202. The data storage 206 may be storage of a cloud computing platform that is accessible by the computing system 202. As illustrated, the data storage 206 may be used to store the drawing files 108 and their corresponding layers 110 described in more detail above with respect to FIG. 1. The computing server 210 may communicate with the database 120 through a local connection or over the network 250.

The computing server 210 may include one or more computing devices. The computing server 210 may include, or be configured to operate, the layer mapper 106. The computing server 210 may also include one or more other modules described above with respect to FIG. 1. For example, the computing server 210 may include, or be configured to operate, one or more of the audit module 114, the data sync module 116, the graphic sync module 118, the rendering module 130, and the tile renderer 136. The computing server 210 may communicate with the computing system 202 over the network 250 using, for example, one or more application programming interfaces (APIs) for communications. The computing server 210 may be remote with respect to computing system 202. The computing server 210 may be part of a cloud computing platform. The computing server 210 may be part of another server system. For example, the computing server 210 may be a management, instrumentation, and discovery (MID) server.

The computing server 210 also includes the database 120 described in more detail above with respect to FIG. 1. The database 120 may be locally stored on the computing server 210. The database 120 may be storage of a cloud computing platform that is accessible by the computing server 210. As illustrated, the database 120 may be used to store database tables 220 and mapping data 224 described in more detail below. The database 120 may also store sync preferences 226 that may be used by the data sync module 116 and/or the graphics sync module 118 of FIG. 1.

The network 250 can include public and/or private networks and can include the Internet. The network 250 can include a cellular network.

In general, a space element can refer to a data element of a drawing file. A space element may correspond to a real-world item. As an example, a space element can represent a particular room, wall, piece of furniture, elevator, set of stairs, outlet, fixture, electrical component, plumbing component, etc. A space element may be unique in that each space element can have a unique space code that can be used to identify the space element, and/or in that the space element may represent a particular real-world item. A space element may include one or more data components having corresponding data values. These data components may include, for example, a name for the space element, a unique space code (e.g., a unique numeric value for the drawing file, for the computing system that stores or created the drawing file, or for the entire CAFM system; a unique alphanumeric value for the drawing file or for the entire CAFM system, for the computing system that stores or created the drawing file, or for the entire CAFM system; etc.), one or more types or categories that the space element is associated with (e.g., a wall may be represented by a space element that is categorized as a structural component; a room may be represented as a space element that is categorized as a bathroom; etc.), a location (e.g., geospatial coordinates), one or more polylines that define the boundaries of the real-world item that the space element represents, etc. As will be discussed in more detail below, a layer mapping module may be configured to extract space elements and/or the data components of space elements from a drawing file, such as a CAD file.

In general, a layer mapping module corresponds to the layer mapper 106 that is described above with reference to system 100 of FIG. 1 and system 200 of FIG. 2. Modules of system 100 and the system 200, including the layer mapping module, may be implemented in hardware, software, or both. For example, the term "module" can include, but is not limited to, computing devices configured to execute one or more software programs, such as program code that causes a processing unit(s) of the device to execute one or more functions. The computing device can be a computing server, a smart handheld device, or other related device able to process data.

FIG. 2 also illustrates a flow of data, shown as stages (A) to (C), with each representing a step in an example process. Stages (A) to (C) may occur in the illustrated sequence, or in a sequence that is different from the illustrated sequence. For example, some of the stages may occur concurrently. Additionally, there may be more or less stages than what is depicted.

In stage (A), a user of the computing system 202 (e.g., the user 104 shown in FIG. 1) may initiate one or more layer mapping workflows. The user may initiate the one or more workflows by initiating the transfer of one or more drawing files to the computing server 210. For example, the one or more layer mapping workflows may be initiated by a user selecting the drawing file 108*a* for transmission to the computing server 210 and/or by selecting an interface element to transmit the drawing file 108*a*. Additionally or alternatively, the user may initiate the one or more workflows for layer mapping by generating and/or initiating the transfer of mapping instructions 208 to the computing server 210. In general, the user may initiate layer mapping or a program session (e.g., that includes the one or more layer mapping workflows among other workflows associated with other modules) by interacting with the user interface 204 of the computing system 202. As an example, the user may select an interface element of the user interface 204 that, when selected, generates instructions to fetch all or part of at least one of the drawings files 108 from the data storage 206, and transmit the fetched data to the computing server 210.

As an example, a user of the computing system 202 may provide parameters that are used to determine what data should be fetched from the data storage 206 and/or should be used for current program session (e.g., that should be used for layer mapping workflows as well as for workflows related to other modules of the system 100). In more detail, the user may specify a building, a floor of a building, an area of a floor of a building, and/or specific items or types of items that should be used (or not used) for the current program session (e.g., relating to a particular project, a particular user making the request, a group of users that the user making the request belongs to, etc.) and/or for layer mapping. A user may create the mapping instructions 208 in which they indicate that they wish to view the electrical and plumbing components of the 9th floor of a particular office building. In response to the creation of the mapping instructions 208 at the computing system 202, the computing system 202 may retrieve the drawing file 108a ("Drawing File A") from the data storage 206 before transmitting it to the computer server 210. The drawing file 108a may be a computer design model for the particular office building, or a computer design model for the 9th floor of the particular office building.

In more detail, the mapping instructions 208 may include information that is used to identify the drawing file 108a, and/or to identify a subset of drawing layers that should be extracted from the drawing file 108a and/or included in the layer file 238. For example, the mapping instructions 208 may include an identifier such as a name or space code the area that the drawing file 108a correspond to. As will be described in more detail below, the computing server 210 may use this identifier to request the drawing file 108a from the data storage 206. The mapping instructions 208 may additionally or alternatively include indications of space elements (e.g., particular floors of a building, rooms in a building, items in a building such as particular pieces of furniture or particular equipment, etc.) or types of space elements (e.g., building floor, building room, bathroom, office, plumbing, electrical, furniture, security devices, etc.) for inclusion in the layer file 238 or excluded from the layer file 238. The mapping instructions 208 may also include permanent or temporary updates to the mapping data 224 and/or to a particular template of the templates 228 that is to be used for generating the layer file 238. That is, the mapping instructions 208 may include one or more protocols or adjustments to protocols that provide how to aggregate data values of the drawing file 108a's drawing layers.

The mapping instructions 208 may be generated by an administrator of the CAFM system, by an end-user such as the user 104, or by another party such as a project manager.

In some implementations, the mapping instructions 208 are previously generated. In initiating a program session and/or layer mapping, a user of the computing system 202 may make one or more selections that correspond to previously generated mapping instructions 208 and/or a particular template of the templates 228.

The mapping instructions 208 may additionally or alternatively indicate a template of the templates 228 that should be used in generating the layer file 238. As will be discussed in more detail below, each template in the templates 228 of the mapping data 224 may correspond to a particular drawing file of the drawing files 108, to particular elements in the particular drawing file (e.g., particular space codes), to a type of area (e.g., building, office building, floor, floor of office building, etc.) that the particular drawing file or an identified portion of the drawing file represents, and/or to element types present in the particular drawing file. One or more of the templates 228 may also correspond to particular systems, users, or group of users, e.g., that initiates the program session and/or the layer mapping workflows. For example, one or more of the templates 228 may correspond to a particular end-user, to a particular group of users that an end-user or requesting user belong to, or to the computer system 202.

Additionally or alternatively, one or more of the templates 228 may correspond to different program session types, project types, or user attributes. For example, a certain template of the templates 228 may correspond to construction of a building. This template may provide for the removal of all layers that include—and/or the filtering of all space elements that are classified as—furniture, as security devices, as fixtures, etc. As another example, a particular template of the templates 228 may correspond to users having a particular security level or having a security level that is less than a threshold security level. This template may provide for the removal of all layers that include—and/or the filtering of all space elements that are classified as—security devices and/or are tagged with security level that is greater than the particular security level (e.g., security level of the end-user) or that is equal to or greater than the threshold security level.

As will be discussed in more detail below, the templates may include one or more protocols that call for extracting data values from drawing files, and/or aggregating the data values into eligible CAD layers. The templates 228 of the mapping data 224 may indicate how the CAFM layers of the database tables 220 are organized and/or generated. That is, the templates 228 may include information that indicates the parameters or criteria for assigning data values to different CAFM layers. As an example, the templates 228 of the mapping data 224 may indicate that any extracted data values determined to be associated with a desk, a cubicle, or a conference table are eligible for assignment to a first CAFM layer corresponding to office furniture. The template 228 may indicate that data values determined to be associated with a chair or a sofa are not eligible for assignment to the first CAFM layer.

The templates 228 of the mapping data may provide an organization of extracted data values that are assigned to an eligible layer (e.g., a CAFM layer), and/or an organization of eligible layers. For example, a subset of CAFM layers that correspond to a particular template of the templates 228 may include a first CAFM layer corresponding to office furniture, a second CAFM layer corresponding to other furniture, and a third, higher tier CAFM layer corresponding to all furniture that includes the first CAFM layer values and the second CAFM layer values. As will be discussed in more detail below, the layer mapper 106 can map portions of the layer data for different layers to a hierarchy of CAFM layers as defined in the database 120 to produce the grouping of CAD layers 112.

In some implementations, the computing server 210 initiates the one or more layer mapping workflows automatically. For example, the computing server 210 may initiate the one or more layer mapping workflows prior to receiving or obtaining the drawing file 108a and/or without receiving the mapping instructions 208. The computing server 210 may initiate the one or more layer mapping workflows based on a detected event. The event may be a scheduled event or a triggering event. As an example, a triggering event may be the detection of an update made to the one of the drawing files 108, an update made to the database tables 220, or an update to the mapping data 224. The triggering event may also correspond to the detection of a milestone being reached, such as construction milestone of a building.

In initiating layer mapping, a user may provide parameters that are used to determine what data should be fetched from the data storage 206 and/or should be synchronized with corresponding data of the computing server 210. For example, the user may specify a building for layer mapping, a floor of a building for layer mapping, an area of a floor of a building for layer mapping, and/or specific items or types of items that should be used (or not used) for layer mapping. In more detail, a user may specify in the mapping instructions 208 that they need to view the electrical and plumbing components of the $9^{th}$ floor of a particular office building. In response to receiving the mapping instructions should be used for data synchronization and that data related to all items should be synchronized except for data corresponding to security devices (e.g., security cameras) in the computer design model (e.g., security cameras). In response, the computer device 202 may retrieve the drawing file 108a ("Drawing File A") from the data storage 206 before transmitting it to the computer server 210. The drawing file 108a may be a computer design model for the particular office building, or a computer design model for the $9^{th}$ floor of the particular office building.

In some implementations, the computing system 202 automatically determines what drawing files or parts of the drawing file should be used during the program session for the layer mapping. The computing system 202 may, for example, compare a last time and/or date that a program session was run using the drawing files 108, a particular drawing file of the drawing files 108, or a particular portion of a drawing file of the drawing files 108 with corresponding last modified times/dates to identify what data should be fetched from the data storage 206 and transmitted to the computing server 210. For example, in response to a user initiating a program session and/or layer mapping, the computing system 202 may determine that the drawing file 108a was transmitted to the computing server for a program session two weeks ago but was recently modified two days ago. As such, the computing system 202 may automatically select the drawing file 108a for the program session and, therefore, layer mapping.

In stage (B), the computing system 202 transmits one or more computer design models, or one or more portions of computer design models, to the computing server 210. For example, after retrieving the drawing file 108a from the data storage 206, the computing system 202 may transmit the drawing file 108a to the computing server 210 over the network 250. Additionally or alternatively, the computing system 202 may transmit the mapping instructions 208 to the computing server 210.

The computing system 202 may transmit the one or more computer design models, or one or more portions of computer design models, with the mapping instructions 208. The mapping instructions 208 may be used by the computing server 210 to the one or more layer mapping workflows. As an example, the computing server 210 may use the mapping instructions 208 to identify a template of the templates 228 to use in the performance of the layer mapping workflows.

In some implementations, the computing system 202 transmits a portion of a computer design model. For example, the computing system 202 may transmit one or more layers of a subset of the layers 110 that correspond to the $9^{th}$ floor of the office building represented by the drawing file 108a. Here, the subset of the layers 110 may be all layers of the drawing file 108a.

In some implementations, as discussed above, the computing system 202 may transmit only the mapping instructions 208. The computing server 210 may, in response to receiving the mapping instructions 208, extract data from the mapping instructions to identify a drawing file to request from the data storage 206. For example, the mapping instructions 208 may include an identifier that the computing server 210 uses to request the drawing file 108a or a portion of the drawing file 108a from the data storage 206 over the network 250.

In stage (C), the computing server 210 provides the received drawing file(s) to the layer mapper 106 to generate the layer file 238 that contains the CAD layers 112. The computing system 210 can also select one or more templates from the templates 228 and provide the selected templates to the layer mapper 106. For example, the computing system 210 may select a first template 240 ("Template A") from the templates 228 to provide to the layer mapper 106. Alternatively, the layer mapper 106 may use the mapping instructions 208 and/or the mapping data 224 to select the template 240 from the templates 228. As will be described in more detail below, the layer mapper 106 may use the template 240 to generate the layer file 238 and the CAD layers 112.

The template 240 may be selected by the layer mapper 106 based on information included in the mapping instructions 208, such as an identifier for the template 240, an identifier (e.g., name, employee ID, driver's license, etc.) for the user (e.g., administrator or project manager) that initiated the program session, an identifier for the end-user, etc. For example, the layer mapper 106 may use an employee ID number to look up a profile for the employee. The profile may indicate that the employee is working as a plumber on the building associated with the drawing file 108a. Based on this, the computer system 210 may identify the template 240 which may provide for generating CAD layers that depict the plumbing structures of the building, e.g., and little else so as to improve efficiency and allow the employee to more easily digest the information that is critical to their job.

The template 240 may alternatively be selected by the layer mapper 106 based on the drawing file 108a. For example, the template 240 may be permanently associated with the drawing file 108a. As another example, the layer mapper 106 may use information extracted from the drawing file 108a (e.g., such as a file name) to look up a schedule (e.g., project schedule, milestone completion schedule, progress schedule, etc.) associated with the building to determine which template to select from the templates 228. For example, the template 240 may be associated with building construction immediately after the pouring of concrete floors is complete.

Users may be able to generate and/or customize templates to meet their preferences. Continuing the example of the plumber employee above, the employee may provide instructions to adjust the template 240 such that electrical structures will also be depicted in the CAD layers 112, e.g., to have the information needed to minimize the risk of electrocution in case of a water leak and/or to identify how to turn of the building's electricity prior to performing plumbing work. The instructions to adjust the template 240 may be part of the mapping instructions 208.

In some implementations, the computing server 210 generates a template recommendation prior to generating the layer file 238 and the CAD layers 112. The template recommendation may include one or more templates of the templates 228 that are determined by the computing server 210 to be most relevant to the current program session, e.g., based on one or more of the user initiating the program session, the end-user, a detected event, the drawing file selected or area (e.g., building) associated with the selected drawing file, etc. The computing server 210 may proceed to transmit the recommendation to the computing system 202 or to one or more other remote computing devices. The computing server 210 may wait to receive instructions indicating a selection of the particular template of the templates 228 that should be used by the layer mapper 106 to generate the layer file 238 and the CAD layers 112.

The computing system 210 may also provide the mapping instructions 208 or a portion of the mapping instructions 208 to the layer mapper 106, e.g., if the mapping instructions 208 include additional or modified protocols for generating the layer file 238 and the CAD layers 112. As example, the computer server 210 may use the layer mapper 106 to extract the necessary or preferred data in the drawing file 108*a*, and to organize at least some of the extracted data into one or more CAFM layers as the CAD layers 112. Each of the CAD layers 112 can, for example, represent a floor of a building, an office on a particular floor of a building, a room or other defined area of the building (e.g., on a particular floor of the building), a group of space elements such as structural elements (e.g., stairs, elevators, walls, doors, windows, etc.) or furniture elements, etc.

As shown, the layer mapper 106 may perform a first operation 230 to obtain layers from the drawing file 108*a*. Obtaining layers from the drawing file 108*a* may include obtaining all layers of the drawing file 108*a*, or a subset of layers from the drawing file based on the template 240. The obtained layers may include all or a subset of the layers 110.

That is, the generated CAD layers 112 may correspond to all or a portion of the drawing file 108*a*. For example, if the drawing file 108*a* is computer design model of a ten story building, there may be ten layers that each corresponding to a particular floor of the building. However, the layer mapper 106 may, in accordance with the protocols of the selected template 240, generate the CAD layers 112 using only a portion of the data values in or extracted from the drawing file 108*a*. For example, the protocols of the template 240 may provide for extracting data values from only those layers of the drawing file 108*a* that are associated with the $9^{th}$ floor of the building represented by the drawing file 108*a*. As another example, the mapping instructions 208 may similarly supplement the selected template 240 to provide for extracting data values from only those layers of the drawing file 108*a* that are associated with the 9th floor of the building represented by the drawing file 108*a*.

As shown, the layer mapper 106 may determine to perform one or more workflows along a first path, or to perform one or more different workflows along a second path in order to generate the CAD layers 112.

As an example, the layer mapper 106 can choose to perform the one or more workflows associated with the first path if the drawing file 108*a* was previously generated using the template 240, or one or more other templates (e.g., similar templates of the templates 228), such that the subset of layers obtained from the drawing file 108*a* are already organized into CAFM layers.

In the first path of workflow operations, the layer mapper 106 can perform a second operation 232*a* to a remove a subset of one or more layers from the layers obtained from the drawing file 108*a*. The layer mapper 106 may use the template 240 to identify which layers to remove from the obtained layers. For example, the protocols of the template 240 may provide for keeping one or more of the obtained layers. Any layers that were not kept or modified may be removed by the layer mapper 106. In more detail, the template 240 may specify for the inclusion of a furniture element layer that contains only office furniture. If the obtained layers includes a layer that contains only office furniture, the layer mapper 106 may determine that the layer should be kept.

In some implementations, the layer mapper 106 may aggregate different layers of the obtained layers into a single layer. For example, if the layers obtained from the drawing file 108*a* include multiple layers containing only office furniture, the layer mapper 106 may aggregated the multiple layers into a single office furniture layer.

In the first path of workflow operations, the layer mapper 106 can additionally or alternatively perform a third operation 234*a* to filter out elements from the obtained layers (or the remaining layers after removal of one or more of the obtained layers). For example, the protocols of the template 240 may provide for the removal of specific elements from the obtained layers (e.g., identified by a space code or a name), the retention of specific elements in the obtained layers (e.g., identified by a space code or a name), the removal of specific types of elements (e.g., identified by a space element type identifier such as a name for the type of element) from the obtained layers, or the retention of specific types of element (e.g., identified by a space element type identifier such as a name for the type of element) in the obtained layers. Accordingly, in performing the operation 234*a*, the layer mapper 106 can modify one or more of the obtained layers.

In some implementations, the first path includes a fourth operation to organize the remaining layers into a hierarchy or a new hierarchy in accordance with the protocols of the template 240.

In some implementations, the operations 234*a* is performed prior to the operation 232*a*.

In some implementations, only the operation 232*a* is performed.

In some implementations, only the operations 234*a* is performed.

The layer mapper 106 may proceed to use the remaining and/or modified layers to generate the layer file 238. In this example, the CAD layers 112 may include the remaining and/or modified layers generated during the workflow operations associated with the first path.

An example of the implementation of the workflow operations associated with the first path is described in more detail below with respect to FIG. 3.

The layer mapper 106 may alternatively choose to perform the one or more workflows associated with the second path if the drawing file 108*a* was not previously generated using the template 240 (or a similar template of the templates 228), it is unknown if the drawing file 108*a* was previously generated using the template 240 (or a similar template of the templates 228), or was otherwise not previously organized into CAFM layers.

The layer mapper 106 may choose to perform the workflow operations associated with the second path by default. In performing the workflow operations associated with the second path, the layer mapper 106 may perform a translation function that imports and reads layer data for M number of layers in the drawing file 108*a* and determines a grouping of N number of layers based on processes performed against the layer data for M number of layers. In this example each of M and N are integers greater than one, and N is less than M. The resulting grouping of N number of layers may be the CAD layers 112 of the layer file 238 generated by the layer mapper 106.

In the second path of workflow operations, the layer mapper 106 may perform a second operation 232*b* to extract data values from the drawing file 108*a* layers obtained during the performance of the operation 230. In extracting the data values, the layer mapper 106 may parse through the obtained layers in accordance with the protocols of the template 240. The data values extracted may include, for example, data values associated with the different elements (e.g., space elements) in the drawing file 108*a*. In more detail, the extracted elements may include metadata describing the different layers or space elements in the layers, names of elements, types of elements, identifiers for elements (e.g., space codes), locations for elements (e.g., coordinates, polylines etc.), etc.

In the second path of workflow operations, the layer mapper 106 may perform a third operation 234*b* to assign at least a subset of the extracted data values to new CAD layers in accordance with the protocols of the template 240. The new CAD layers may be CAFM layers in that the parameters that define the new CAD layers is the same as a subset of CAFM layers of the database tables 220. The parameters may include criteria that defines eligible space elements for the layer, eligible space element types of the layer, eligible sizes for particular space elements or for space elements associated with a particular type of space element, eligible locations for particular space elements or for space elements associated with a particular type of space element, etc. The parameters may additionally or alternatively define a hierarchal structure for the new CAD layers (e.g., the subset of CAFM layers).

As an example, the protocols of the template 240 may call for adding any structural space elements that are categorized as wall elements to a room layer so long as the resulting area of the room formed by the grouping of interior wall elements is less than one-hundred square feet. The protocols of the template 240 may further provide for organizing this room layer in a hierarchy with one or more other layers. For example, the layer mapper 106 may organize the room layer under a more general structure layer that includes all of the space elements in the room layer in addition to other space elements, such as stairwells, elevators, exterior walls, etc.

The layer mapper 106 may assign all or only a subset of the extracted data values to one or more of the new CAD layers. Accordingly, the layer mapper 106 may filter out certain data values that are not needed in accordance with the protocols of the template 240.

The information filtered out of the drawing file 108*a* may include, for example, superfluous information or ambiguous boundaries which can inhibit importation of data into a space management program. The space management program can extract information such as space names, types, and codes from the CAD document to facilitate space management of a floor or entire building represented by the CAD document. Other information that can be filtered out may include, for example, duplicate space codes, multiple space code per polyline, and/or overlapping polylines. Filtering out this information has a multitude of beneficial effects such as reducing the amount of data that needs to be processed by the computing server 210 and, therefore, the load on the CPU(s) and/or the CPU hours required. For example, by filtering out the 50% of the data values presented in the drawing file 108*a*, the computing server 210 can significantly reduce the CPU hours required to perform additional operations associated with the drawing file 108*a* by using the CAD layers 112 (e.g., operations associated with other modules described above with respect to FIG. 1).

Numerous other benefits can be achieved such as being able to produce various different drawing file versions for a single base drawing file. For example, the techniques can be used to generate a version of the drawing file 108*a* for each person working on a project, or for each group of persons working on the project. The template used for generating the new version can be customized based on the preferences of each of the different users or the preferences of each of the different groups so as to present only the information that those persons or groups require and/or to make the information presented more digestible (e.g., which may have the benefit of reducing misinterpretations or other human errors), and, thereby, improve efficiency.

The layer mapper 106 may proceed to use the new CAD layers to generate the layer file 238. In this example, the CAD layers 112 may include the new CAD layers. Accordingly, the CAD layers 112 can each be CAFM layers as described herein.

In some implementations, the operations 232*b* and 234*b* are performed in accordance with protocols provided in the mapping instructions 208 in addition to or in place of one or more protocols of the template 240.

In some implementations, the second path includes a fourth operation to organize the new CAD layers into a hierarchy in accordance with the protocols of the template 240.

An example of the implementation of the workflow operations associated with the first path is described in more detail below with respect to FIG. 4.

In some implementations, the layer file 238 generated by the layer mapper 106 is a DWG file.

In some implementation, the layer file 238 generated by the layer mapper 106 is in a format other than DWG format. For example, the layer mapper 106 may output a file that is in a different drawing file format, such as a STEP, IGES, parasolid, STL, VRML, X3D, COLLADA, or DXF format.

Figure 3:
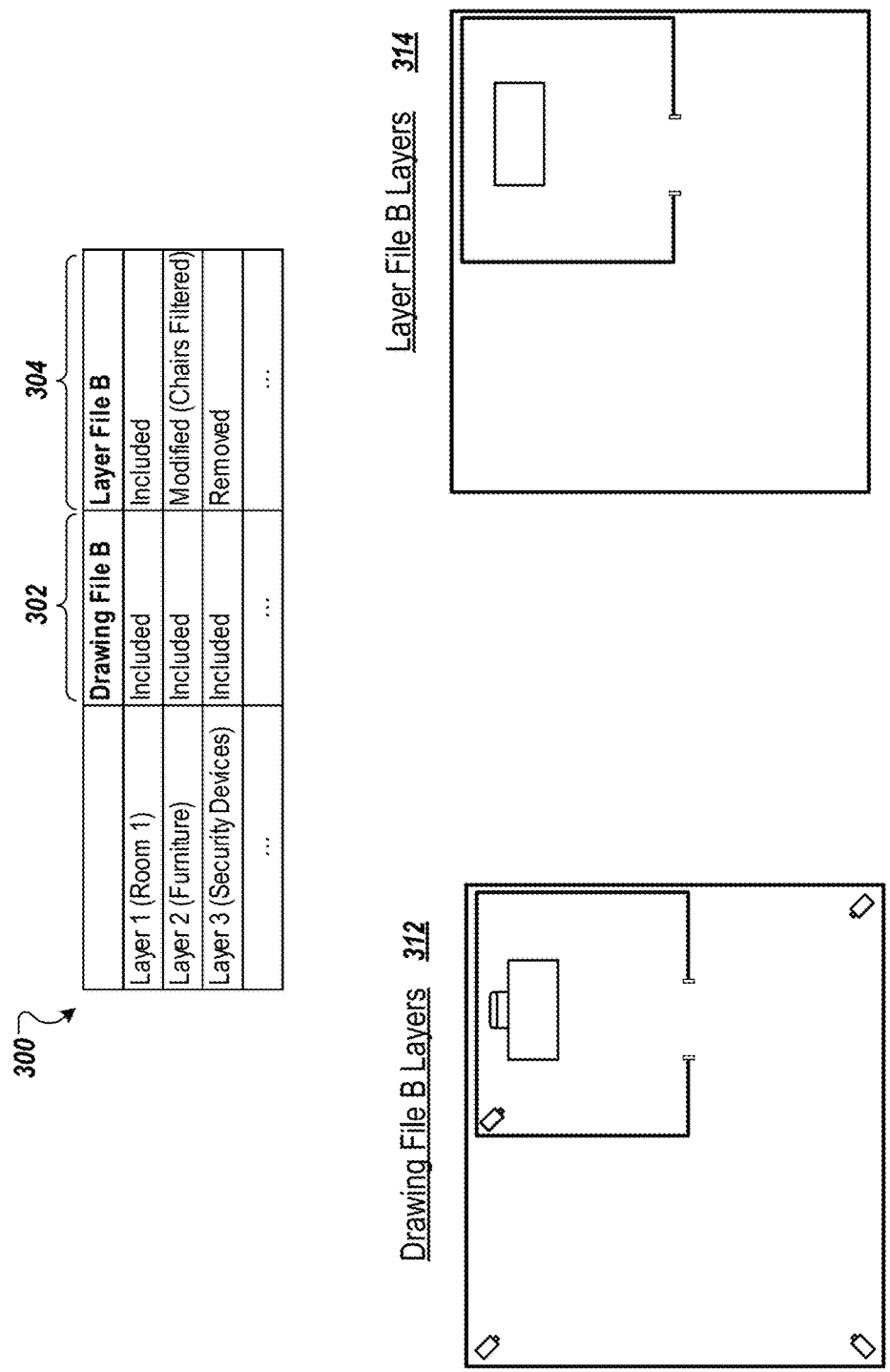
FIG. 3 illustrates an example drawing layer table and example drawing layer depictions.

FIG. 3 illustrates an example drawing layer table 300 and example drawing layer depictions 312 and 314. The example of FIG. 3 may correspond to the first path workflow operations described above with respect to FIG. 2.

As shown, the drawing layer table 300 includes a first column corresponding to different drawing layers in a drawing file, a second column corresponding to the drawing file (Drawing File B), and a third column corresponding to a layer file (Layer File B) generated by the layer mapper 106. As an example, with respect to FIG. 2, the layer mapper 106 may determine using the template 240 that a first layer corresponding to a first room for inclusion in the layer file 304 as part of the generated CAD layers, that a second layer corresponding to furniture should be modified before being included in the generated layer file 304, and that a third layer corresponding to security devices should be not be included in the layer file 304.

As an example, the layer mapper 106 may determine not to include the third layer based on a profile associated with an end-user indicating that they have a security level that is insufficient to access the information found in the third layer.

The depiction 312 of the drawing file 302 includes all layers of the drawing file 302. The depiction 314 represents an example drawing file that the computing server 210 may receive from the computing system 202 and/or provide to the layer mapper 106 as input. As shown, the depiction 312 includes representations of the first room in the building, furniture in the first room (e.g., desk and chair), and the security devices throughout the building.

The depiction 314 of the layer file 304 includes only the subset of retained and/or modified layers originally obtained from the drawing file 302. The depiction 314 represents an example layer file that the layer mapper 106 may generate as output. As shown, the depiction 314 includes representations of the first room in the building and a desk in the first room. The depiction 314 does not include representations, and the layer file 304 does not include data, corresponding to the security device elements and the chair element.

Figure 4:
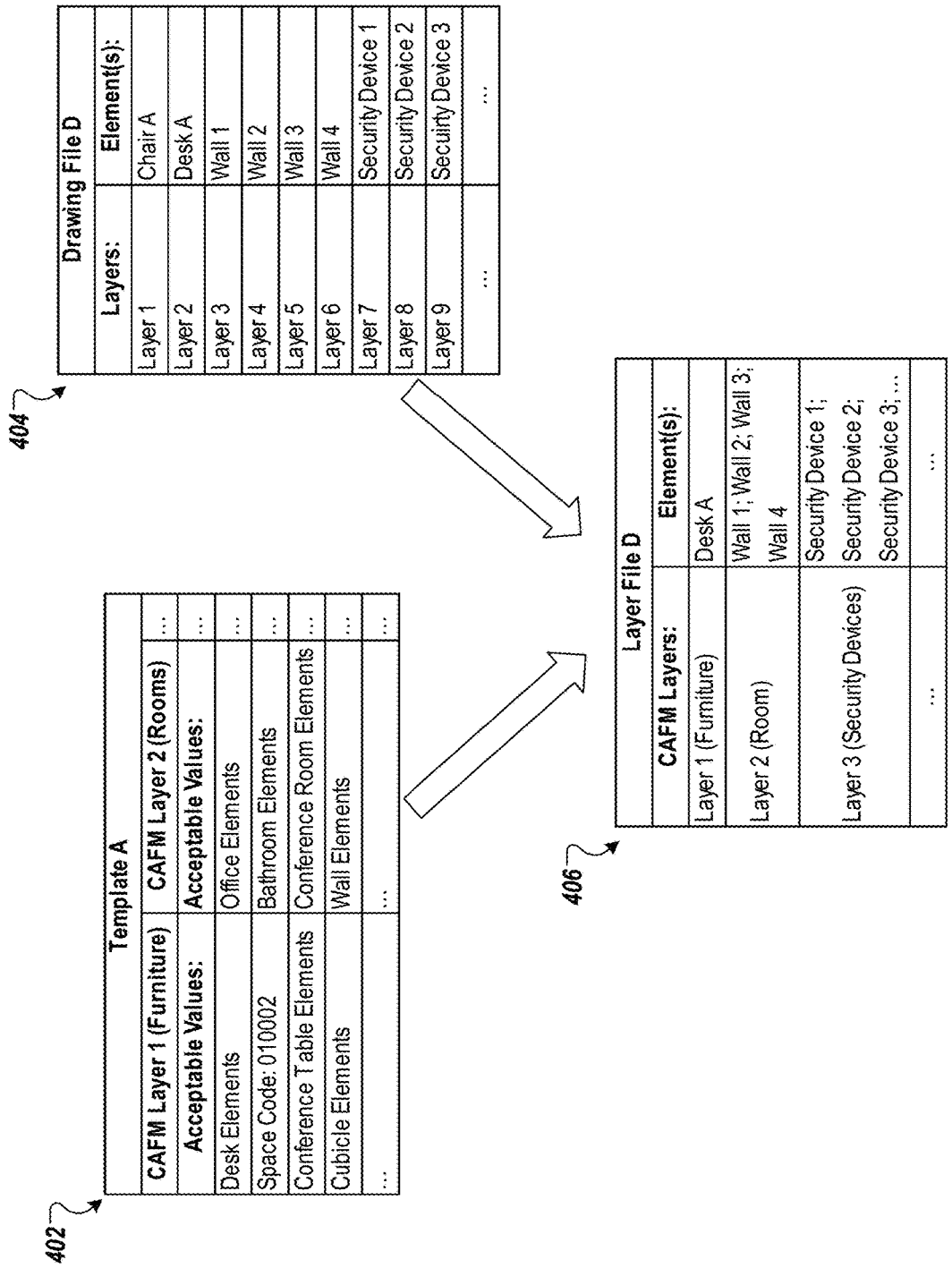
FIG. 4 illustrates an example template, drawing file, and layer mapping output file.

FIG. 4 illustrates an example template 402, drawing file 404, and layer mapping output file 406. The example of FIG. 4 may correspond to the second path workflow operations described above with respect to FIG. 2.

The template 402 represents an example template of the templates 228 described above with respect to FIG. 2. The template 402 may include parameters that define one or more CAFM layers. As shown, the template 402 includes parameters corresponding to multiple CAFM layers. The parameters may include a list of acceptable data values or data value ranges for the each of the multiple CAFM layers.

As shown, the template 402 includes a first column corresponding to a furniture layer, and a second column corresponding to room a layer. The parameters associated with the furniture layer and the room layer include acceptable data values, such as acceptable space element types (e.g., identified using an element type name) and acceptable space elements (e.g., identified using a space code).

In some implementations, the template may include other parameters. For example, the template 402 may include parameters that define a hierarchy of CAFM layers associated with the template 402.

As an example, the template 402 may be associated with a particular user, such as the office manager for a building. In more detail, in response to identifying the end-user as the office manager for a building associated with the drawing file 404, the computing server 210 may look up the template 402 from the templates 228 and retrieve the template 402 from the database 120. Similarly, the template 402 may be associated with a particular role or position. In more detail, in response to determining from a profile associated with the end-user that the end-user is assigned the position of office manager, the computing server 210 may look up and retrieve the template 402 from the database 120.

In addition to positions or roles, user profiles may include other information that the computing server can use to select a template from the templates 228. For example, the user profiles may include one or more identifiers for the user (e.g., employee ID, name, etc.), a security level or clearance for the user (e.g., user is permitted to view or otherwise access additional or different data the higher their security clearance), historical data (e.g., past drawing files that the user has viewed or processed, past projects that the user has worked on, etc.), projects that the user is currently working on and/or the user's role in those projects, etc.

The drawing file 404 represents an example drawing file that the computing server 210 may receive from the computing system 202 and/or provide to the layer mapper 106 as input. The drawing file 404 includes a number of layers. The layers may be disorganized in that they include one or small number of space elements, include a random assortment of space elements (e.g., space elements of different types)

As an example, with respect to FIG. 2, in extracting the data values from the drawing file 404, the layer mapper 106 may extract data values corresponding to each of the space elements in the drawing file 404. That is, the layer mapper 106 may extract a name or identifier for each space element (e.g., space code), classifications associated with each space element (e.g., the one or more types of space elements), locations (e.g., GPS coordinates, polylines, etc.) for each of the space elements, etc. In doing this, the layer mapper 106 can effectively extract each of the space elements from the drawing file 404.

The layer file 406 represents an example layer file that the layer mapper 106 may generate as output using the template 402 and the drawing file 404. As an example, the layer mapper 106 may generate the layer file 406 by applying one or more protocols associated with the template 402 to the data values extracted from the drawing file 404 so as to generate one or more CAFM layers that meet the parameters of the template 402.

As an example, one or more protocols of the template 402 may provide for extracting space element types from the each of the layers in the drawing file 404, matching the extracted space element types to acceptable values, and, if a match is determined, aggregating extracted data values associated with the matching space element to the corresponding CAFM layer. In more detail, the layer mapper 106 may in accordance with the first protocols, parse through the layers of the drawing file 404 for space element types. In doing this, the layer mapper may identify a chair type space element in the first layer of the drawing file 404 and a desk type space element in the second layer of the drawing file 404. In accordance with the first protocols, the layer mapper 106 may compare the extracted space element types to the acceptable values for the first CAFM layer ("CAFM Layer 1 (Furniture)") and/or the acceptable values for the second CAFM layer ("CAFM Layer 2 (Rooms)"), and, based on the comparison, determine that the desk type space element in the second layer of the drawing file 404 should be assigned to the first CAFM layer and that the chair type element in the first layer of the drawing file 404 should not be assigned to either the first CAFM layer or the second CAFM layer. Similarly, the layer mapper 106 may determine that four wall type space elements in layers three through six of the drawing file 404 match acceptable values in the second CAFM layer.

Continuing with this example, in accordance with the first protocols, the layer mapper 106 may aggregate data values associated with each of the eligible (e.g., matching) space elements to form the CAFM layers for the layer file 406. For example, the layer mapper 106 may aggregate all of the data values extracted from the second layer of the drawing file 404 that represent or are otherwise associated with the Desk A space element to form a first CAFM layer of the layer file 406. Similarly, the layer mapper 106 may aggregate all of the data values extracted from the third, fourth, fifth, and sixth layers of the drawing file 404 that are represent or are otherwise associated with the Wall 1 space element, the Wall 2 space element, the Wall 3 space element, and the Wall 4 space element to form a second CAFM layer of the layer file 406.

The layer mapper 106 may perform a second set of protocols to perform similar actions with respect to other attributes of the space elements in the drawing file 404. For example, the template 402 may provide for extracting space codes from layers in the drawing file 404 and determine if any of the extracted space codes match corresponding acceptable values for the CAFM layers. If a match is found, the layer mapper 106 may similarly aggregate the data values to generate a new CAFM layer for the layer file 406 and/or to update a previously generated CAFM layer for the layer file 406.

Figure 5:
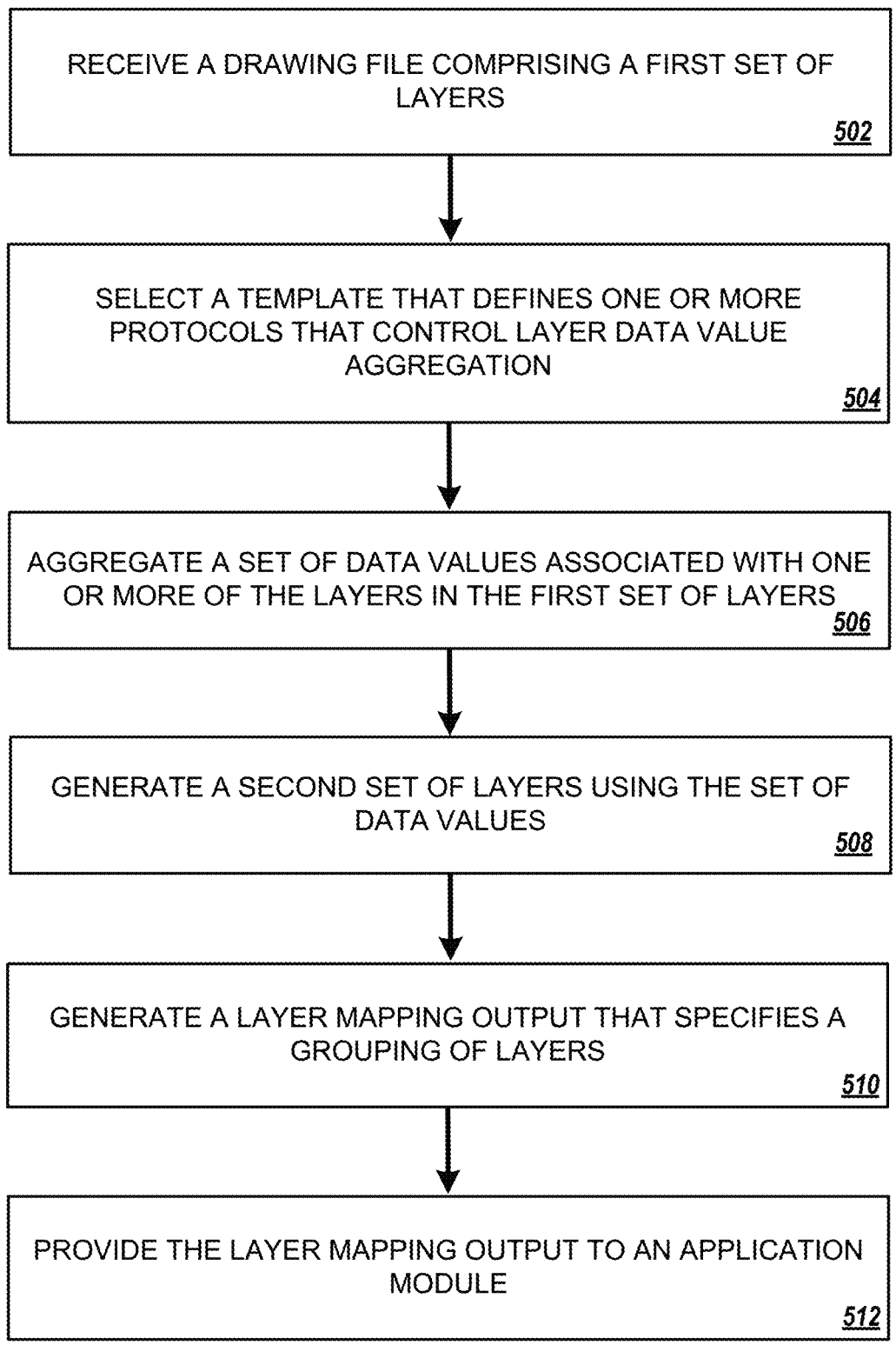
FIG. 5 illustrates an example process for performing a layer mapping operation.

FIG. 5 illustrates an example process for performing a layer mapping operation. The process may be performed, for example, by the computing server 210 shown in FIG. 2. In some implementations, all or part of the process may be performed by the data sync module 116 of computing server 210.

The process includes receiving a drawing file comprising a first set of layers (502). The drawing file may be a CAD file, such as a STEP file, a QIF file, a PDF file, a stereolithography (STL) file, an initial graphics exchange (IGES) file, an ACIS file, a Parasolid file, an additive manufacturing file, a Wavefront file, a 3D manufacturing format file, an Autodesk file, a Collada file, an X3D file, etc. The drawing file may be in a native CAD format. For example, the drawing file may be an AutoCAD file, a Blender file, a SolidWorks file, an Inventor file, or a SketchUp file. The drawing file may contain a set of layers that each contain one or more space elements.

As an example, with respect to FIG. 2, the computing server 210 may receive the drawing file 108a from the external computing system 202. The computing system 202 may send the drawing file 108a to the computing server 210 over the network 250. Alternatively, the computing server 210 may receive the drawing file 108a from the computing system 202 or from the data storage 206 in response to the computing server 210 generating and sending a request for the drawing file 108a. The computing server 210 may generate a request for the drawing file 108a and send it to the computing system 202 and/or the data storage 206 in response to receiving the mapping instructions 208. Alternatively, the computing server 210 may generate and send request for the drawing file 108a automatically. For example, the computing server 210 may generate a request for the drawing file 108a in response to detecting an event, such as determining that a milestone in a construction project corresponding to the drawing file 108a (e.g., construction of a building represented by the drawing file 108a) has been reached. The computing server 210 may proceed to send the request to the computing system 202 or the data storage 206.

In some implementations, receiving the drawing file includes receiving a drawing file that includes a set of layers that correspond to at least one of: a floor plan of a property; an interior wall of a property; an exterior wall of a property; a room of a property; an interior area of a property; locations of security devices of a property; capabilities of Wi-Fi hotspots in a property; or types of furniture in a property. For example, with respect to FIG. 4, a first layer of the drawing file 404 may include a furniture space element named "Chair A" and a seventh layer of the drawing file may include a security device space element named "Security Device 1."

In some implementations, receiving the drawing file includes receiving a computer-aided design document. For example, the drawing file 108a may be a CAD document.

In some implementations, receiving the drawing file includes generating a request for the drawing file in response to detecting an event corresponding to the drawing file, and transmitting the request for the drawing file to an external computing system. For example, the computing server 210 may generate a request for the drawing file 108a in response to determining that an update was made to the drawing file 108a, that a milestone of project associated with an area represented by the drawing file 108a has been reached, a current time and/or date matching a scheduled time and/or date, etc.

The process includes selecting a template that defines one or more protocols that control layer data value aggregation (504). For example, with respect to FIG. 2, the computing server 210 or the layer mapper 106 may select one or more templates from the templates 228 to use. Each of the templates 228 may include one or more protocols for extracting and/or aggregating data values in the layers of the drawing file 108a.

The computing server 210 and/or the layer mapper 106 may select a particular template from a plurality of templates. As an example, the layer mapper 106 may select the template 240 from the templates 228 based on the template 240 corresponding to a particular user or group of users (e.g., based on a user or group of users that initiates the current space management program session and/or the layer mapping module; or based on an end-user that is anticipated to obtain a visual rendering of a design model generated using the CAD layers 112), to a particular drawing file (e.g., that the computing server 210 receives from the computing system 202), a particular user attribute (e.g., a security level or permission level, a project role, employment status, position or title, etc. as may be indicated by one or more user profiles), a particular event (e.g., particular construction milestone), etc.

As another example, the layer mapper 106 may select the template 240 based on instructions received from the computing system 202 and/or provided by a user. For example, the mapping instructions 208 may include an identifier for the template 240 that the layer mapper 106 can extract from the instructions 208 and use to lookup the template 240 in the database 120.

In some implementations, the computing server 210 and/or the layer mapper 106 select multiple templates that may be used to generate the CAD layers 112. For example, a first template selected may correspond to the end-user's position as an electrician and a second template selected may correspond to the end-user's security level of 4/5. The first template may include one or more protocols for extracting and/or aggregating data values form the first drawing file 108a that correspond to electrical type space elements and structural space elements. The second template may include one or more protocols that limit the inclusion of data values associated with space elements tagged with a security level of 5/5. That is, the second template may limit the extraction and/or aggregation of data values in the drawing file 108a to those that are associated with space elements not tagged with a security level or tagged with a security level of 0/5, 1/5, 2/5, 3/5, or 4/5. The layer mapper 106 may consolidate the protocols of the first template with the protocols of the second template to effectively create a new temporary (or permanent template). In consolidating the two templates and applying them, the layer mapper 106 may, for example, only extract and/or aggregate data values in the drawing file 108a that correspond to electrical or structural type space elements that are either (i) not tagged with a security level or (ii) tagged with a security level of 0/5, 1/5, 2/5, 3/5, or 4/5.

The template may also provide for filtering data values that correspond to duplicate or otherwise erroneous space elements. For example, if the drawing file 108a includes two layers that each contain the same space element (e.g., representing a chair in the same location), the protocols of the template 240 may provide for keeping data values corresponding to only one of the duplicated space elements.

In some implementations, selecting the template that defines the one or more protocols includes identifying one or more attributes of the design model, and, based on the one or more attributes, selecting the template from a plurality of templates. For example, the layer mapper 106 may determine that a name of the drawing file 108*a* corresponds to the template 240 of the templates 228. Based on this determinations, the layer mapper 106 may retrieve the template 240 from the database 120 to process the drawing file 108*a*.

The process includes aggregating a set of data values associated with one or more of the layers in the first set of layers (506). As an example with respect to FIG. 1, the layer mapper 106 can aggregate the set of data values associated with the one or more of the layers of the layers 110 in response to applying at least one of the one or more protocols to one or more of the CAD drawing files 108.

In some implementations, aggregating the set of data values includes applying at least one protocol to the set of data values to determine a subset of data values of the set of data values that meet inclusion criteria for at least one of the layers in the second set of layers. For example with respect to FIG. 3, the layer mapper 106 may identify a set of inclusion criteria for the layer file 304 (e.g., of the CAD layers 112). The inclusion criteria may include specified types of space elements, locations (e.g., buildings, floors of buildings, or portions of floors), or layers in the original drawing file. For example, the layer mapper 106 may apply inclusion criteria that provides for keeping layers that include the location of Room 1 and that include furniture space elements. The layer mapper 106 may also apply other criteria that is used to exclude layers or portions of layers. For example, the layer mapper 106 may apply criteria that provides for the exclusion of layers that include security device space elements or for the removal of security device space elements from layers containing them. Similarly, the layer mapper 106 may apply criteria that provides for the filtering of particular types of space elements, locations, or layers. For example, the layer mapper 106 may apply criteria that provides for filtering chair space elements from the furniture layer (layer 2) of the original drawing file 302.

In some implementations, aggregating the set of data values includes aggregating data values corresponding to one or more particular space elements together in a layer of the second set of layers in accordance with the template. For example with respect to FIG. 3, the template may provide that a particular space element for a desk in Room 1 be included in the CAD layers 112. The layer mapper 106 may proceed to aggregate data values extracted from the drawing file 302 (and/or the CAFM layers 113) that are associated with this particular desk space element, such as the name, ID, location, size, and attributes of the desk.

In some implementations, aggregating the set of data values includes aggregating data values corresponding to one or more types of space elements together in a layer of the second set of layers in accordance with the template. For example with respect to FIG. 3, the template may provide that furniture space elements be included in the CAD layers 112. The layer mapper 106 may proceed to aggregate data values extracted from the drawing file 302 (and/or the CAFM layers 113) that are associated with all furniture space elements, such as the names, IDs, locations, sizes, and attributes of the furniture space elements.

In some implementations, aggregating the set of data values includes aggregating data values corresponding to space elements located in a particular location or in a defined area. For example with respect to FIG. 3, the template may provide that all data values associated with the first floor of a building be included in the CAD layers 112. The layer mapper 106 may proceed to aggregate data values extracted from the drawing file 302 (and/or the CAFM layers 113) that are associated with space element located in the first floor, such as the names, IDs, locations, sizes, and attributes of those space elements.

In some implementations, aggregating the set of data values includes aggregating data values corresponding to space elements associated with a particular user or group of users. For example with respect to FIG. 3, the template may provide that all space elements generated or modified by a particular user be included in or excluded from the CAD layers 112. The layer mapper 106 may proceed to aggregate data values extracted from the drawing file 302 (and/or the CAFM layers 113) that are associated with those space elements.

The process includes generating a second set of layers using the set of data values (508). As an example with respect to FIG. 2, the layer mapper 106 may generate the CAD layers 112 from the aggregated data values extracted from the drawing file 108*a*. In aggregating the data values, the layer mapper 106 may assign each data value (or each group of data values corresponding to a particular space element) to one or more CAFM layers defined by the template 240. Accordingly, the CAD layers may include those (e.g., only those) CAFM layers that include one or more data values extracted from the drawing file 108*a* and assigned to a CAFM layer in accordance with the template 240, and/or space elements of the drawing file 108*a* that were assigned to a CAFM layer in accordance with the template 240.

As an example, the original drawing file 108*a* may be disorganized in that different layers include the same type of space element, the layers include duplicate space elements, there are a large number of layers, and/or the layers include superfluous information. In generating the second set of layers, the layer mapper 106 may organize all space elements of the same type into the same layer. As another example, the layer mapper 106 may organize all of space elements of the same type and that exist in a particular area to the same layer.

In some implementations, generating the second set of layers using the set of data values includes aggregating, using the layer mapping module, a respective set of data values of one or more of the layers in the first set of layers in response to applying at least one of the protocols to the drawing file. For example, the layer mapper 106 can aggregate data values extracted or otherwise obtained from the drawing file 108*a* and, in doing so, generate the CAD layers 112. As another example, the layer mapper 106 may assign each data value to one or more CAFM layers. After assigning each of the extracted data values or a subset of eligible data values (e.g., eligible for the CAFM layers based on parameters specified in the template 240), the layer mapper 106 may aggregate each group of data values corresponding to a CAFM layer to generate the CAFM layer.

In some implementations, the layer mapper 106 organizes space elements into multiple layers. For example, the layer mapper 106 may assign data values corresponding to a first set of space elements of the same type to a first layer, and also assign a subset of the data values corresponding to the first set of space elements to a second layer. The second layer may include space elements of the particular type (e.g., room or particular type of room, structural element or particular type of structural element, electrical element or particular type of electrical element, furniture elements, security device elements, etc.) that are also found in a particular area (e.g., particular building, particular floor of a building, particular area on a floor of a building, etc.).

Similarly, in generating the second set of layers, the layer mapper 106 may organize the layers in the second set of layers into one or more layer hierarchies in accordance with the template 240. Continuing the earlier example, the layer mapper 106 may assign the first layer corresponding to the particular type of space element to a first hierarchal level that is above a second hierarchal level assigned to the second layer corresponding to the particular type of space element and particular area the space element must be located in.

In some implementations, the process includes generating the second set of layers using the set of data values includes aggregating, using the layer mapping module, a respective set of data values of one or more of the layers in the first set of layers in response to applying at least one of the protocols to the drawing file. For example, prior to generating the CAD layers 112 and/or the layer file 238, the layer mapper 106 can aggregate data values extracted or otherwise obtained from the drawing file 108a. The layer mapper 106 may use these aggregated values to generate the CAD layers 112 and/or the layer file 238.

In some implementations, each of the layers in the second set of layers is associated with a set of inclusion criteria defined by the template. For example, each of the drawing layers in the CAD layers 112 can correspond to a set of inclusion criteria defined by the template 240. This inclusion criteria may include, for example, a particular space element (e.g., having a particular space code), a particular type of space element, a particular user being associated with one or more space elements, a particular security level or range of security levels that space elements are tagged with, a particular location where space elements are located, a particular area that space elements are located in, etc.

In this example, aggregating the set of data values of the one or more of the layers in the first set of layers in response to applying at least one of the protocols to the drawing file can include applying the at least one of the protocols to the set of data values of the one or more of the layers to determine a subset of data values of the set of data values that meet the inclusion criteria for at least one of the layers in the second set of layer. For example, the layer mapper 106 may only use those data values and/or corresponding space elements to generate a CAD layer of the CAD layers 112 if those data values and/or corresponding space elements meet the inclusion criteria.

In some implementations, generating the second set of layers includes assigning each of the data values in the subset of data values to at least one of the layers in the second set of layers. For example, the subset of data values may include those data values that meet or that correspond to space elements that meet the inclusion criteria for one or more of the CAD layers 112 as defined by the template 240.

In some implementations, generating the second set of layers includes determining for the data values in the subset of data values a set of space elements for inclusion in the second set of layers, obtaining additional data values associated with the space elements in the set of space elements, and aggregating the subset of data values and the additional data values in accordance with the protocols of the template to generate the second set of layers. For example, the layer mapper 106 may first extract only the space codes for different space elements in the layers of the drawing file 108a. After determining that one or more of the space elements are eligible for a CAFM layer (e.g., based on one or more extracted space codes matching acceptable space code values for the CAFM layer), the layer mapper 106 may extract additional data values from the drawing file 108a that correspond to the one or more space elements. For example, the layer mapper 106 may proceed to extract names for the space elements, locations for the space elements (e.g., coordinates), polylines for the space elements, etc. from the drawing file 108a. This can increase efficiency by reducing the amount of data processing that the computing server 210 needs to perform.

In some implementations, aggregating the set of data values of the one or more of the layers in the first set of layers in response to applying at least one of the protocols to the drawing file includes aggregating data values corresponding to one or more particular space elements together in a layer of the second set of layers in accordance with the template. For example, the template 240 may indicate that space elements having a space code in a list of acceptable space codes meet the inclusion criteria for a particular CAFM layer. The layer mapper 106 may proceed to generate a CAD layer of the CAD layers 112 using at least the data values corresponding to those space elements in the drawing file 108a whose space code is in the list of acceptable space codes. As an example, the layer mapper 106 may generate the CAD layer by aggregating those the data values corresponding to those space elements whose space code is in the list of acceptable space codes required by the template 240 for the particular CAFM layer.

In some implementations, aggregating the set of data values of the one or more of the layers in the first set of layers in response to applying at least one of the protocols to the drawing file includes aggregating data values corresponding to one or more types of space elements together in a layer of the second set of layers in accordance with the template. For example, the template 240 can indicate that space elements categorized as a specific type of space element meet the inclusion criteria for a particular CAFM layer. The layer mapper 106 may proceed to generate a CAD layer of the CAD layers 112 using at least the data values corresponding to those space elements in the drawing file 108a that are categorized as being the specified type of space element. As an example, the layer mapper 106 may generate the CAD layer by aggregating those data values in the drawing file 108a that are categorized as being the specified type of space element required by the template 240 for the particular CAFM layer.

In some implementations, aggregating the set of data values of the one or more of the layers in the first set of layers in response to applying at least one of the protocols to the drawing file includes aggregating data values corresponding to space elements located in a particular location or in a defined area. For example, the template 240 can indicate that space elements located in a particular area meet the inclusion criteria for a particular CAFM layer. The layer mapper 106 may proceed to generate a CAD layer of the CAD layers 112 using at least the data values corresponding to those space elements in the drawing file 108a that are located in the specified area. As an example, the layer mapper 106 may generate the CAD layer by aggregating those the data values in the drawing file 108a that are located in the specified area as required by the template 240 for the particular CAFM layer.

In some implementations, aggregating the set of data values of the one or more of the layers in the first set of layers in response to applying at least one of the protocols to the drawing file includes aggregating data values corresponding to space elements associated with a particular user or group of users. For example, the template 240 can indicate that space elements that were created by or are managed by a particular user or group of users meet the inclusion criteria for a particular CAFM layer. The layer mapper 106 may proceed to generate a CAD layer of the CAD layers 112 using at least the data values corresponding to those space elements in the drawing file 108a that were created by or are managed by a particular user or group of users are located in the specified area. As an example, the layer mapper 106 may generate the CAD layer by aggregating those the data values in the drawing file 108a that were created by or are managed by a particular user or group of users as required by the template 240 for the particular CAFM layer.

The process includes generating a layer mapping output that specifies a grouping of layers (510). As an example, with respect to FIG. 2, the layer mapper 106 may generate the layer file 238 containing the CAD layers 112. The layer file 238 may be a CAD file.

The process includes providing the layer mapping output to an application module (512). The application module can be a module of a space management program for extracting information such as space names, types, and codes from the output (e.g., a CAD document) to facilitate space management of a floor or entire building represented by the output. As an example, with respect to FIGS. 1-2, after generating the layer file 238 containing the CAD layers 112, the layer mapper 106 and/or the computing server 210 may provide the layer file 238 and/or the CAD layers 112 to the space management system 185. The space management system 185 can run a space management program for extracting information such as space names, types, and codes from the output to facilitate space management of a floor or entire building represented by the output (e.g., CAD document).

In some implementations, the output is provided to an audit program. For example, layer mapper 106 and/or the computing server 210 may provide the layer file 238 and/or the CAD layers 112 to an audit module 114. The audit module 114 may perform one or more workflow operations using the layer file 238 and/or the CAD layers 112. In more detail, the audit module 114 can run an audit program to automatically identify issue-prone practices such as unclosed polylines, missing space codes, duplicate space codes, multiple space code per polyline, and overlapping polylines and correct them. The corrected output (e.g., CAD document) can then be provided to the space management program.

The application module may also be performed by the computing server 210. Alternatively, the application module may be performed by one or more external systems. Accordingly, the computing server 210 and/or the layer mapper 106 may transmit the layer file 238 and its CAD layers 112 to the one or more external systems over the network 250.

In some implementations, the process includes extracting the set of data values of the one or more layers in the first set of layers in response to applying at least one of the protocols to the drawing file. For example, with respect to FIG. 2, the layer mapper 106 may extract a set of data values from the layers obtained from the drawing file 108a (e.g., in performing the operation 232b). The data values extracted may correspond to particular space elements or particular types of space elements. For example, the template 240 can include one or more protocols that call for extracting data values corresponding to space elements that are categorized as electrical equipment.

In extracting data values from the drawing file, the layer mapping module may parse the drawing file. For example, with respect to FIG. 2, the layer mapper 106 may selectively parse through each layer of the drawing file 108a in order to extract the data values from the drawing file 108a or a subset of data values from the drawing file 108a.

In some implementations, the process includes obtaining a set layers from the drawing file. For example, the layer mapper 106 may identify the layers in and/or extract the layers from the drawing file 108a. The layer mapper 106 may determine that only a subset of the layers of the drawing file 108a need to be obtained, e.g., as indicated by the template 240 and/or the mapping instructions 208. In this example, the layer mapper 106 may identify a subset of the layers in the drawing file 108a and/or extract only the subset of layers from the drawing file 108a. After obtaining the layers or the subset of layers of the drawing file 108a, the layer mapper 106 may proceed to extract and/or aggregate data values from the layers or the subset of layers in accordance with the protocols of the template 240.

In some implementations, the process includes receiving instructions from a remote computing device. Here, selecting the template that defines the one or more protocols can include selecting the template from a plurality of templates based on the instructions. For example, the layer mapper 106 may select the template 240 from the templates 228 using the mapping instructions 208.

In some implementations, a first number of layers in the first set of layers is greater than a second number of layers in the second set of layers. For example, the layers in the drawing file 108a may be greater than the number of layers in the CAD layers 112.

In some implementations, a data size corresponding to the first set of layers is greater than a data size corresponding to the second set of layers. For example, the data size of the drawing file 108a may be greater than the data size corresponding to the CAD layers 112, and/or the data size of the layer file 238.

In some implementations, a single layer in the second set of layers includes data values corresponding to multiple space elements, and multiple layers in the first set of layers include data values corresponding to the multiple space elements such that no single layer in the first set of layers includes data values corresponding to the multiple space elements. For example, with respect to FIG. 4, Layer 2 of the layer file 406 may include the space elements of Layers 3-6 of the drawing file 404.

Figure 6:
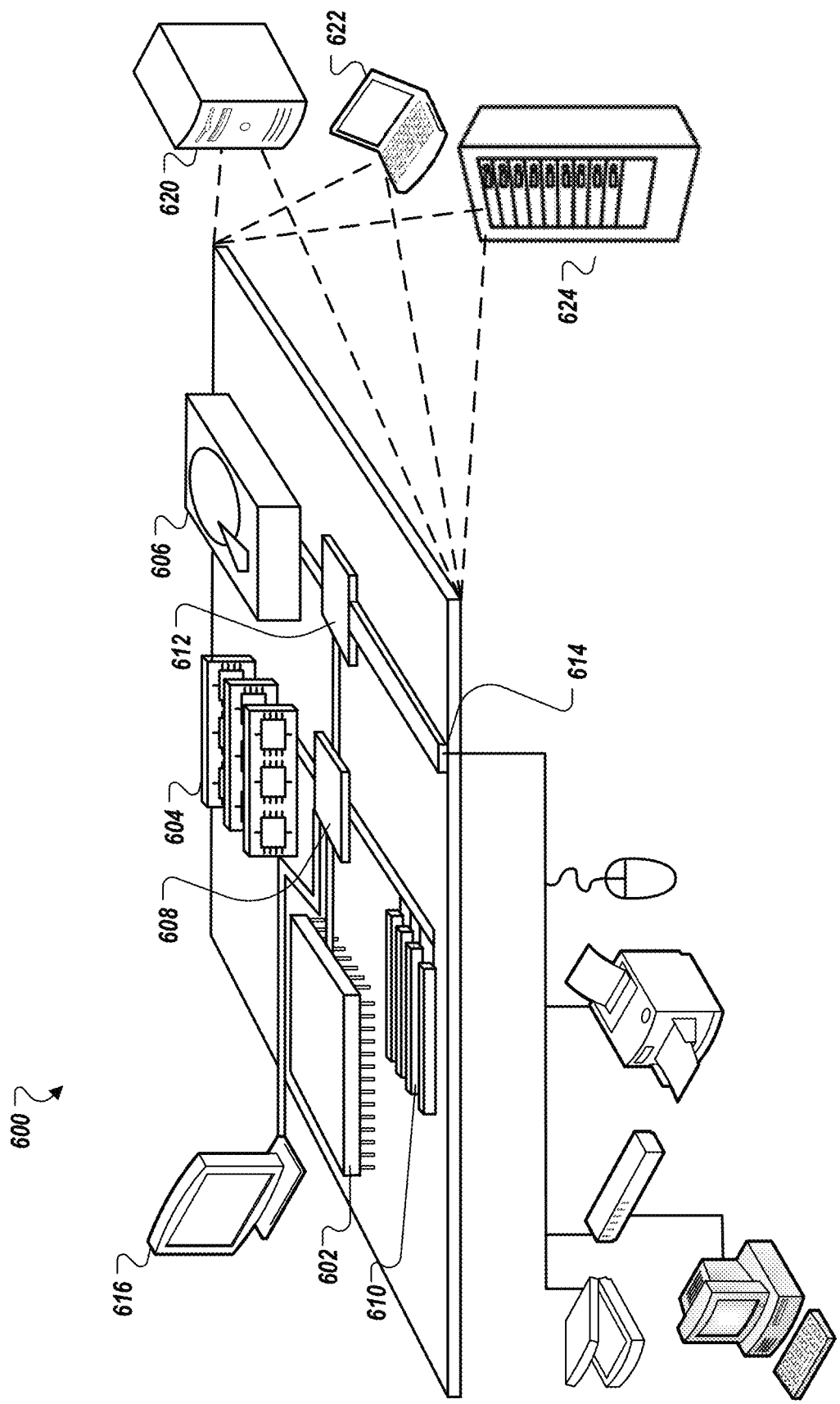
FIG. 6 illustrates an example block diagram of a computing system that can be used in connection with computer-implemented methods described in this document.

FIG. 6 shows a diagram of an example of a computing device 600 which can be used to implement one or more of the systems and techniques described herein, as either a client, clients, server, servers, etc. In some implementations, the computing device 600 is referred to as a data processing apparatus. Computing device 600 is intended to represent various forms of digital computers, such as laptops, mobile devices, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 600 includes a processor 602, memory 604, a storage device 606, a high-speed interface 608 connecting to memory 604 and high-speed expansion ports 610, and a low-speed interface 612 connecting to low-speed bus 614 and storage device 606. Each of the components 602, 604, 606, 608, 610, and 612, are interconnected using various busses, and can be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high-speed interface 608. In other implementations, multiple processors and/or multiple buses can be used, as appropriate, along with multiple memories and types of memory. Also, multiple computing devices 600 can be connected, with each device providing portions of the necessary operations (e.g., as a server bank, a group of blade servers, or a multi-processor system).

The memory 604 stores information within the computing device 600. In one implementation, the memory 604 includes a computer-readable medium such as a flash memory. In one implementation, the memory 604 includes a volatile memory unit or units such as RAM. In another implementation, the memory 604 includes a non-volatile memory unit or units.

The storage device 606 is capable of providing mass storage for the computing device 600. In one implementation, the storage device 606 is a computer-readable medium such as a hard drive or solid state drive. In various different implementations, the storage device 606 can be a floppy disk device, a hard disk device, an optical disk device, or a tape device, a flash memory or other similar solid state memory device, or an array of devices, including devices in a storage area network or other configurations. The computer program product contains instructions that, when executed, perform one or more methods, such as those described above.

The high-speed interface 608 manages bandwidth-intensive operations for the computing device 600, while the low speed controller 612 manages lower bandwidth-intensive operations. Such allocation of duties is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which can include various communication ports (e.g., universal serial bus (USB), Bluetooth, Ethernet, wireless Ethernet) can be coupled to one or more input/output devices, such as a keyboard, a pointing device, a scanner, or a networking device such as a switch or router, e.g., through a network adapter.

The computing device 600 can be implemented in a number of different forms, as shown in the figure. For example, it can be implemented as a server 620, or multiple times in a group of such servers. It may also be implemented as part of a rack server system 624. In addition, it can be implemented in a personal computer such as a laptop computer 622.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; USB drive, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the inventions have been described. Other embodiments are within the scope of the following claims. In addition, actions recited in the claims can be performed in a different order and still achieve desirable results.

What is claimed is:

1. A computer-implemented method comprising:
   receiving, by a layer mapping module and from a remote computing device, mapping instructions for viewing components of a building;
   receiving, by the layer mapping module, a drawing file corresponding to the building, the drawing file comprising a first set of layers;
   selecting, by the layer mapping module, based on the mapping instructions, a template comprising one or more protocols that define operations for extracting a set of data values from drawing layers;
   applying, by the layer mapping module, at least one of the one or more protocols to the drawing file to control layer data value aggregation, and to synchronize the components of the building while filtering out, by removing from the set of data values, a portion of the set of data values that indicate locations of existent security devices in a respective layer of the first set of layers to prevent access to the locations of the existent security devices in a respective layer of the first set of layers;
   aggregating, using the layer mapping module, the set of data values associated with one or more of the layers in the first set of layers;
   generating, using the layer mapping module, a second set of layers using the set of data values, wherein each layer in the second set of layers comprises at least one data value of the set of data values;
   generating, using layer mapping module, a layer mapping output that specifies the second set of layers used to graphically render the components and one or more space elements represented in the second set of layers; and
   providing the layer mapping output as an input to an application module of a space management program.

2. The computer-implemented method of claim 1, comprising:
   extracting the set of data values of one or more layers in the first set of layers in response to applying at least one of the protocols to the drawing file.

3. The computer-implemented method of claim 1, wherein:
   each layer in the second set of layers is associated with a set of inclusion criteria defined by the template, and
   aggregating the set of data values comprises applying the at least one of the protocols to the set of data values to determine a subset of data values of the set of data values that meet inclusion criteria in the set of inclusion criteria for at least one of the layers in the second set of layers.

4. The computer-implemented method of claim 3, wherein generating the second set of layers comprises assigning each data value in the subset of data values to a layer in the second set of layers.

5. The computer-implemented method of claim 3, wherein generating the second set of layers comprises:

determining for data values in the subset of data values the one or more space elements as a set of space elements for inclusion in the second set of layers;

obtaining additional data values associated with the one or more space elements in the set of space elements; and aggregating the subset of data values and the additional data values in accordance with the one or more protocols of the template to generate the second set of layers.

6. The computer-implemented method of claim 1, wherein aggregating the set of data values comprises aggregating data values corresponding to one or more particular space elements together in a layer of the second set of layers in accordance with the template.

7. The computer-implemented method of claim 1, wherein aggregating the set of data values comprises aggregating data values corresponding to one or more types of space elements together in a layer of the second set of layers in accordance with the template.

8. The computer-implemented method of claim 1, wherein aggregating the set of data values comprises aggregating data values corresponding to space elements located in a particular location or in a defined area.

9. The computer-implemented method of claim 1, wherein aggregating the set of data values comprises aggregating data values corresponding to space elements associated with a particular user or group of users.

10. The computer-implemented method of claim 1, wherein the components comprise electrical components or plumbing components.

11. The computer-implemented method of claim 1, wherein selecting the template that defines the one or more protocols comprises:
identifying one or more attributes of a design model; and
based on the one or more attributes, selecting the template from a plurality of templates.

12. The computer-implemented method of claim 1, wherein selecting the template that defines the one or more protocols comprises:
determining a security level of an end-user that is to have access to a visual rendering generated using the layer mapping output; and
based on the security level of the end-user, selecting the template from a plurality of templates.

13. The computer-implemented method of claim 1, wherein a first number of layers in the first set of layers is greater than a second number of layers in the second set of layers.

14. The computer-implemented method of claim 1, wherein a data size corresponding to the first set of layers is greater than a data size corresponding to the second set of layers.

15. The computer-implemented method of claim 1, wherein:
a single layer in the second set of layers comprises data values corresponding to a plurality of space elements, and
a plurality of layers in the first set of layers comprise the set of data values corresponding to the plurality of space elements such that no single layer in the first set of layers comprises the set of data values corresponding to the plurality of space elements.

16. The computer-implemented method of claim 1, wherein first set of layers correspond to at least one of:
a floor plan of a property,
an interior wall of the property,
an exterior wall of the property,
a room of the property,
an interior area of the property,
the locations of security devices of the property, the security devices comprising security cameras,
capabilities of Wi-Fi hotspots in the property, or
types of furniture in the property.

17. The computer-implemented method of claim 1, wherein receiving the drawing file comprises receiving a computer-aided design document.

18. The computer-implemented method of claim 1, wherein receiving the drawing file comprises:
generating a request for the drawing file in response to detecting an event corresponding to the drawing file; and
transmitting the request for the drawing file to an external computing system.

19. A system comprising:
a processor; and
a computer-readable storage medium coupled with the processor, wherein the computer-readable storage medium comprises a program for execution by the processor, the program comprising instructions which, when executed by the processor, cause the processor to perform operations comprising:
receiving, by a layer mapping module and from a remote computing device, mapping instructions for viewing components of a building;
receiving, by the layer mapping module, a drawing file corresponding to the building, the drawing file comprising a first set of layers;
selecting, by the layer mapping module, based on the mapping instructions, a template comprising one or more protocols that define operations for extracting a set of data values from drawing layers;
applying, by the layer mapping module, at least one of the one or more protocols to the drawing file to control layer data value aggregation, and to synchronize the components of the building while filtering out, by removing from the set of data values, a portion of the set of data values that indicate locations of existent security devices in a respective layer of the first set of layers to prevent access to the locations of the existent security devices in a respective layer of the first set of layers;
aggregating, using the layer mapping module, the set of data values associated with one or more of the layers in the first set of layers;
generating, using the layer mapping module, a second set of layers using the set of data values, wherein each layer in the second set of layers comprises at least one data value of the set of data values;
generating, using layer mapping module, a layer mapping output that specifies the second set of layers used to graphically render the components and one or more space elements represented in the second set of layers; and
providing the layer mapping output as an input to an application module of a space management program.

20. A non-transitory computer-readable storage medium comprising a program for execution by a processor of a device, the program comprising instructions which, when executed by the processor, cause the device to perform operations comprising:
receiving, by a layer mapping module and from a remote computing device, mapping instructions for viewing components of a building;

receiving, by the layer mapping module, a drawing file corresponding to the building, the drawing file comprising a first set of layers;

selecting, by the layer mapping module, based on the mapping instructions, a template comprising one or more protocols that define operations for extracting a set of data values from drawing layers;

applying, by the layer mapping module, at least one of the one or more protocols to the drawing file to control layer data value aggregation, and to synchronize the components of the building while filtering out, by removing from the set of data values, a portion of the set of data values that indicate locations of existent security devices in a respective layer of the first set of layers to prevent access to the locations of the existent security devices in a respective layer of the first set of layers;

aggregating, using the layer mapping module, the set of data values associated with one or more of the layers in the first set of layers;

generating, using the layer mapping module, a second set of layers using the set of data values, wherein each layer in the second set of layers comprises at least one data value of the set of data values;

generating, using layer mapping module, a layer mapping output that specifies the second set of layers used to graphically render the components and one or more space elements represented in the second set of layers; and providing the layer mapping output as an input to an application module of a space management program.

* * * * *